(12) United States Patent
Sugiura et al.

(10) Patent No.: US 6,798,905 B1
(45) Date of Patent: Sep. 28, 2004

(54) DOCUMENT ORIENTATION RECOGNIZING DEVICE WHICH RECOGNIZES ORIENTATION OF DOCUMENT IMAGE

(75) Inventors: Hiroshi Sugiura, Aichi-Ken (JP); Shoji Imaizumi, Shinshiro (JP); Kazuhiro Ueda, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/350,128

(22) Filed: Jul. 9, 1999

(30) Foreign Application Priority Data

Jul. 10, 1998 (JP) .......................................... 10-195995
Sep. 3, 1998 (JP) .......................................... 10-250124

(51) Int. Cl.[7] .............................................. G06K 9/00
(52) U.S. Cl. ........................ 382/168; 382/169; 382/170; 382/171; 358/483
(58) Field of Search ................................ 358/483, 474; 382/181, 203, 190, 289, 290, 291, 292, 168, 173, 169, 170, 171

(56) References Cited

U.S. PATENT DOCUMENTS

| 5,077,811 A | 12/1991 | Onda | 382/46 |
| 5,506,918 A | * 4/1996 | Ishitani | 382/289 |
| 5,649,033 A | 7/1997 | Morikawa et al. | 382/44 |
| 6,466,340 B1 | * 10/2002 | Washio | 358/488 |

FOREIGN PATENT DOCUMENTS

| JP | 60126769 | 6/1985 | G06K/15/66 |
| JP | 7-65120 | 10/1995 | H04M/1/387 |
| JP | 09083691 | 3/1997 | H04M/1/04 |
| JP | 9-9040 | 10/1997 | H04M/9/20 |
| JP | 09069136 | 11/1997 | G06K/9/20 |

* cited by examiner

Primary Examiner—Jerome Grant, II
(74) Attorney, Agent, or Firm—McDermott Will & Emery LLP

(57) ABSTRACT

An image of a document is divided into a plurality of areas, and a reliability is obtained for each area for a case where an image of the area is used in orientation detection. The reliability is obtained from characteristics of the shape of a histogram generated from image data of the area, as follows. The histogram is divided into a plurality of sections, and an MTF value is calculated for each section by dividing a difference of the max and min values of the section by the sum of the max and min values. A mean value of the MTF values calculated for all of the sections of the histogram is set as the reliability of the area. The orientation detection processing is performed on the area whose reliability is the highest, and an orientation result obtained through the orientation detection processing is judged as the orientation of the image of the document.

14 Claims, 16 Drawing Sheets line direction

Fig. 9
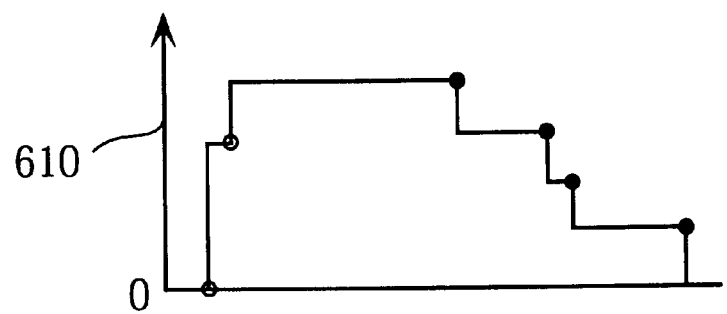
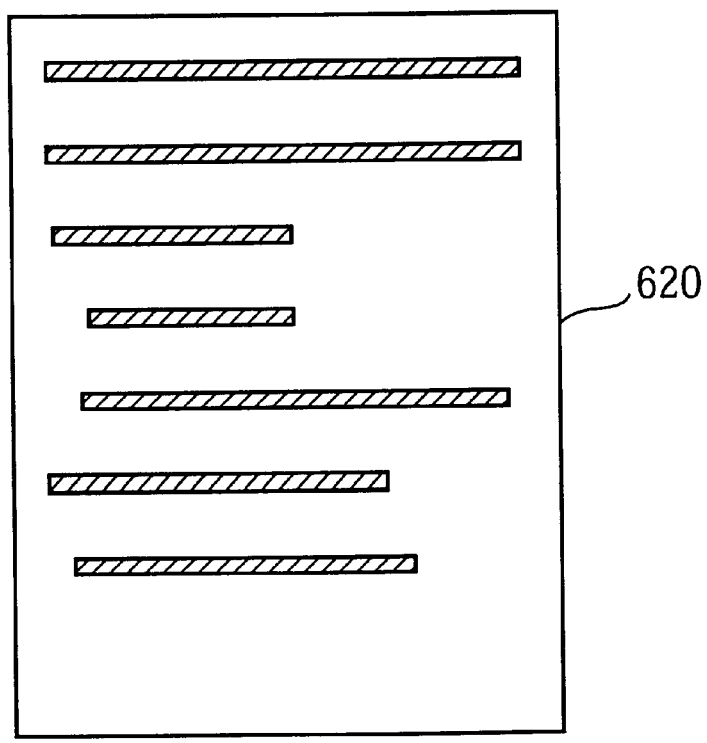
line direction

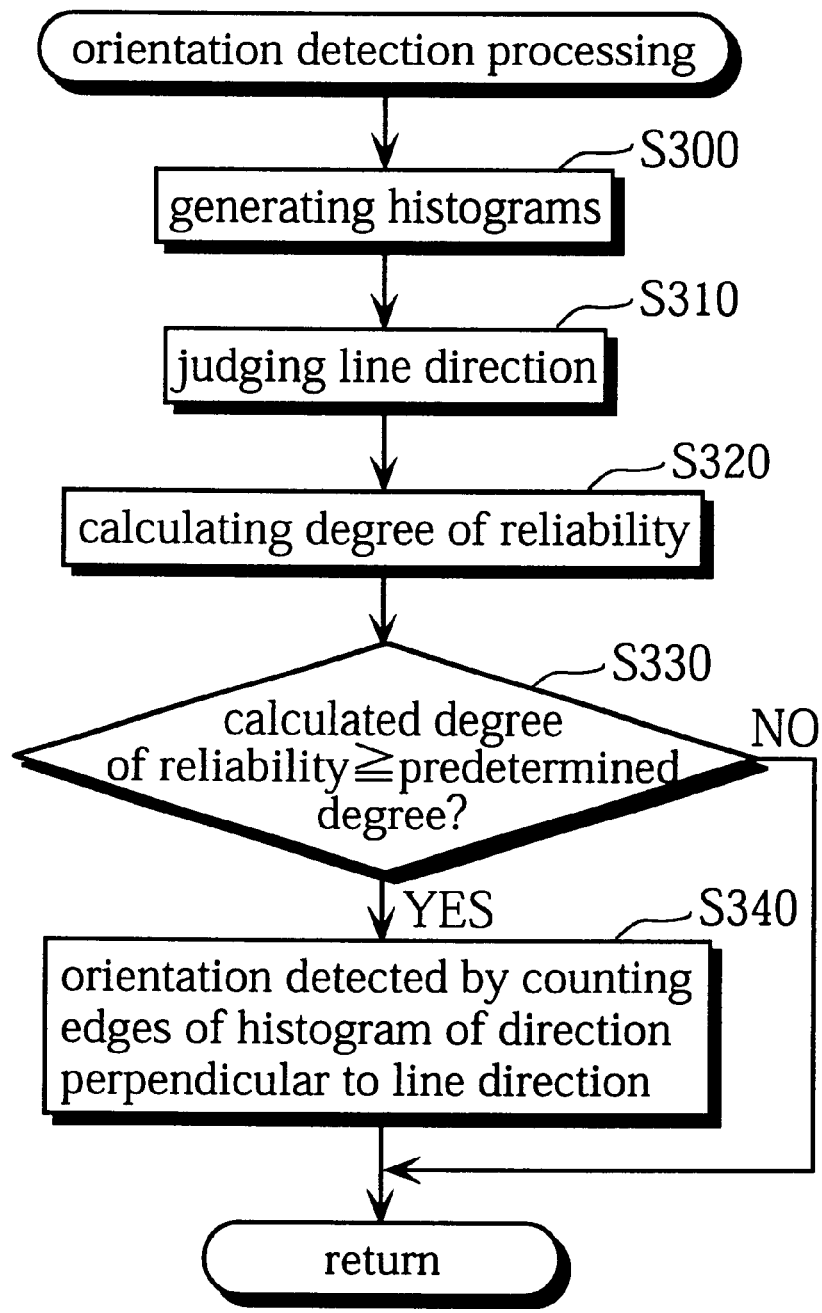

count value   ↑ 2   ↓ 4 count value   ↑ 4   ↓ 4 count value   ↑ 7   ↓ 7

DOCUMENT ORIENTATION RECOGNIZING DEVICE WHICH RECOGNIZES ORIENTATION OF DOCUMENT IMAGE

This application is based on applications No. 10-195995 and No. 10-250124 filed in Japan, the contents of which are hereby incorporated by reference.

BACKGROUND OF THE INVENTION (1) Field of the Invention

The present invention relates to a document orientation recognizing device which is usually provided in an image forming apparatus such as a copier and which recognizes the orientation of an image of a document.

(2) Related Art

There have been research and development in techniques relating to copying multiple documents successively using copiers, especially digital copiers, in such a manner that recording sheets will have respective images thereon in the same orientation regardless of random orientations of documents originally having placed by a user. An example of such a technique is disclosed by Japanese Laid-Open Patent Application No. H06-103710.

When the user sets documents arranged in random orientations on the copier for successive copying operations, the orientations of images formed on the discharged recording sheets (the recording sheets on which images have been formed are referred to as the "copied sheets" hereinafter) are also random in the same way as the documents having set by the user. This means that the user has to arrange the documents in the same orientation before the copying operations or change the orientations of the copied sheets after the copying operations, and this causes great inconvenience.

To align the orientations of images formed on copied sheets, the orientation needs to be detected for each document in accordance with image data of the document (referred to as the "document image data") and image rotation processing may be performed when necessary. Hereinafter, the processing for judging the orientation of a document image is referred to as the "orientation detection processing." In most of orientation detection methods, the orientation of one character retrieved from document image data is detected and that orientation is judged as the orientation of a whole document image. The image rotation processing is performed when the orientation of the document image that has been detected through the orientation detection processing disagrees with a predetermined orientation. Specifically, the image data is rotated a necessary angle so that the orientation of the document image data agrees with the predetermined orientation. By executing image formation based on the rotated image data, the orientations of images formed on copied sheets are oriented in the same direction.

For the orientation detection processing, various methods have been suggested with the aim of increasing processing efficiency and reliability of detection results. As one example, Japanese Laid-Open Patent Application No. H09-69136 discloses a method for increasing the reliability of detection results.

The orientation detection processing is performed on a basic premise that the orientation of characters in a document is identical to the orientation of a whole document image. The aim of the method disclosed in the Application H09-69136 is to reduce detection errors which occur when the orientation detection processing is performed on exceptional characters that exist on documents.

FIGS. 1a and 1b are examples where the orientations of characters on documents do not correspond to the respective orientations of whole document images.

A character string 801 in FIG. 1a is a caption. The "caption" is appended to a graph or figure and explains what the graph or figure is about. The caption characters of the character string 801 are written horizontally in a vertical line, although a document 810 is in portrait format.

A character string 802 in FIG. 1b is composed of characters included in a table (referred to as the "table characters" hereinafter). The character string 802 is written horizontally in a vertical line, although a document 820 is in portrait format.

It can be readily understood that the orientation of the document image is incorrectly detected when the orientation detection processing is performed on the caption characters or table characters. To address this problem, the cited Application No. H09-69136 discloses a method by which the orientation detection processing based on the caption characters and table characters are avoided when possible. This method is achieved according to the following steps.

First, an image part of a document is divided into a plurality of areas. The attribute of each area is next judged. The attribute is judged to be one of "text attribute," "title attribute," "table attribute," and "caption attribute." The text attribute and title attribute respectively indicate that a character in the area belongs to a text and a title. The table character attribute indicates that a character in the area belongs to a table, while the caption attribute indicates a character in the area belongs to the caption explaining what the figure or the like included in the document is about. According to the attribute judged for each area, priorities are respectively assigned to the areas for detecting the orientation of the document. In general, the text and title attributes take precedence over the table and caption attributes. As one example, suppose that the order of priority is text attribute →title attribute→table attribute→caption attribute. A plurality of characters are sampled from the area with the attribute of the highest priority, and the orientation detection processing is performed for each of the sample characters. When the results obtained through the orientation detection processing are the same, that is, the orientations of the sample characters judged to be the same, the orientation of those characters is judged as the orientation of the whole document image. On the other hand, when the orientations of the sample characters are different to each other, another plurality of characters are sampled from the area with the attribute of the second highest priority, and the orientation detection processing is performed for each of the sample characters.

Using this conventional technique, however, the attribute is judged for each area and the orientation detection processing is performed for each area in order of priority. This causes a considerable load. The processing performed in this way improves the precision of an orientation detection result and so is surely useful. Yet, in reality, the order of priority is fixed and the orientation detection processing is performed based on the area with the text or title attribute in most cases. The orientation detection processing may be performed based on the area with the table or caption attribute when the document has these kinds of characters only. In this case, the reliability of the orientation detection result would be low using any orientation detection method. For a document which includes both text and caption, it is likely for the orientation detection processing to be performed based on the text, not on the caption with a low priority. If there should be a case where the orientation detection processing is performed based on the caption instead of the text, the case would be very rare. Accordingly, in most cases, the load caused by the orientation detection processing performed in order of priority that is determined for the areas according to their attributes is too heavy for the effect obtained through this processing.

Meanwhile, there have been copiers which are provided with a mode where a double-page spread from a bound document such as a book is copied page by page. Hereinafter, this mode is referred to as the "page-by-page mode," and bound documents, such as books and magazines, are all referred to as "books." This mode is used when the user makes copies of a book, turning pages one by one. Here, it should be noted that the Japanese language can be written both horizontally and vertically. When the Japanese script is written vertically, it is written from right to left. This means that a book written vertically in Japanese is read in the opposite direction to a book written horizontally. As a result, the order of the page numbers in a book written vertically in Japanese differs from a book written horizontally. More specifically, on a double-page spread, the page with a lower number comes on the right side when the book is written vertically in Japanese, while the page with a lower number comes on the left side when it is written horizontally. Therefore, the page layouts of vertically and horizontally written books are reversed. As such, when making copies of the book vertically written in Japanese, pages are not copied in the correct order. For this reason, the user has to reorder the pages after the copying operations. Moreover, when the book is placed the wrong way round on a platen glass of the copier by mistake, the user has to reorder the pages and also turn the copied sheets the right way round when necessary. This takes much time and effort. Hereinafter, a book vertically written in Japanese is referred to as the "Japanese-style book."

Japanese Laid-Open Patent Application No. H09-83691 discloses a technique to address this problem. By means of this technique, when a book is copied in the page-by-page mode, it is judged from the image data obtained by reading a page of the book whether the book is written vertically or horizontally and whether the book is the right way up. In accordance with the judgement result, the order in which two pages on a spread are copied is changed and the image data is rotated when necessary. As a result, the copying operations are performed in the correct page order, and all of the orientations of the images formed on the copied sheets are the same.

Using this technique, however, the orientation of the book is judged by referring to the orientation of an image of only one page in accordance with the obtained image data. Therefore, it has drawbacks that an error occurs when the respective orientations of two pages on a spread are different and when the orientation of one page cannot be determined.

SUMMARY OF THE INVENTION

The first object of the present invention is to provide a document orientation recognizing device which can recognize the orientation of an image of a document at light load without reducing the reliability of a recognition result.

The second object of the present invention is to provide a document orientation recognizing device which can reliably recognize the orientation of an image of a page from a bound document.

The first object of the present invention can be achieved by a document orientation recognizing device which recognizes an orientation of an image of a document in accordance with a set of image data of the document, the document orientation recognizing device being made up of: a dividing unit which divides the set of image data into a plurality of data blocks, each data block corresponding to a different area obtained by dividing the image of the document; a reliability calculating unit which calculates a reliability for each data block for a case where a set of image data of the data block is used in an orientation recognition of the image of the document; a selecting unit which selects at least one data block whose reliability is higher than other data blocks in accordance with the reliability calculated for each data block by the reliability calculating unit; and a recognizing unit which recognizes the orientation of the image of the document in accordance with each set of image data of the at least one data block selected by the selecting unit.

With this construction, the reliability is calculated for each set of image data of divided data blocks for a case where the set of image data is used in orientation recognition of the image of the document. At least one data block whose reliability is higher than other data blocks is selected, and the orientation of the document is judged in accordance with the orientation detected from the selected data block(s). This allows the orientation recognition to be speedily and reliably executed.

When more than one data block whose reliability is higher than other data blocks is selected, the orientation is detected for each image of these selected data blocks. When the orientations are identical to each other, the identical orientation is judged as the orientation of the image of the document. By doing so, precision of the orientation recognition is increased.

The second object of the present invention can be achieved by a document orientation recognizing device made up of: a receiving unit which receives two sets of image data associated with first and second pages of a double-page spread; and a recognizing unit which recognizes an orientation of an image of the first page in accordance with the set of image data associated with the first page, and recognizes an orientation of an image of the second page in accordance with the set of image data associated with the second page.

With this construction, the orientation is recognized for each page on a double-page spread.

It is quite likely that the orientations of images of two pages (the first and second pages) on a double-page spread are identical to each other. For this reason, when it is impractical to detect the orientation of the image of the first page, the orientation of the image of the second page may be regarded as the orientation of the first page as well.

The reliability is obtained for each set of image data of the two pages on the spread for a case where the set of image data is used in orientation recognition of the image of the corresponding page. From the reliability, it is judged for each page whether the orientation recognition to be performed is practical or impractical.

The reliability can be obtained by generating a histogram from a target set of image data and executing a calculation using a difference of the max and min values of the histogram or using the number of rising points and the number of falling points of the histogram. Here, a rising point refers to a turning point where the present value increases from the previous value, and a falling point refers to a turning point where the present value decreases from the previous value.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 9 is a drawing to help explain the edge counting performed for obtaining another criterion of the reliability;

FIG. 13 is a flowchart showing the orientation detection processing of FIG. 12 that is performed for each page;

DESCRIPTION OF PREFERRED EMBODIMENTS

The following is a description of a document orientation recognizing device of the present invention, with reference to the accompanying drawings. In the embodiments, the document orientation recognizing device of the present invention is provided in a digital copier (simply referred to as the "copier" hereinafter).

First Embodiment (1) Construction of the Copier

Figures 1A, 1B:
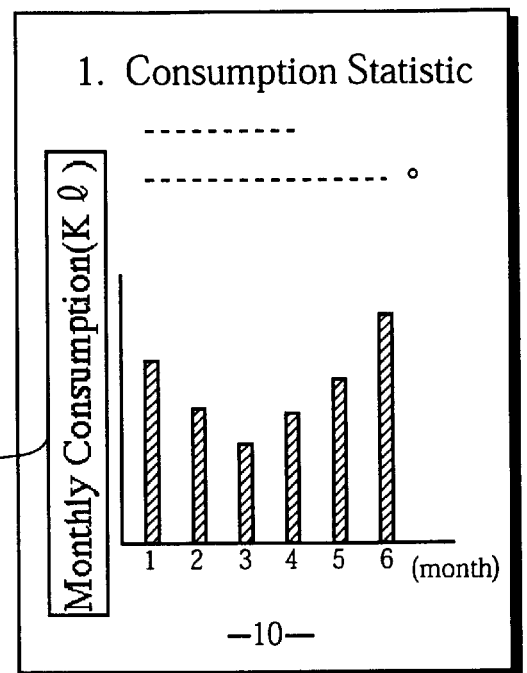
FIGS. 1a and 1b show examples of characters that cause detection errors in the conventional orientation detection processing.
Figure 2:
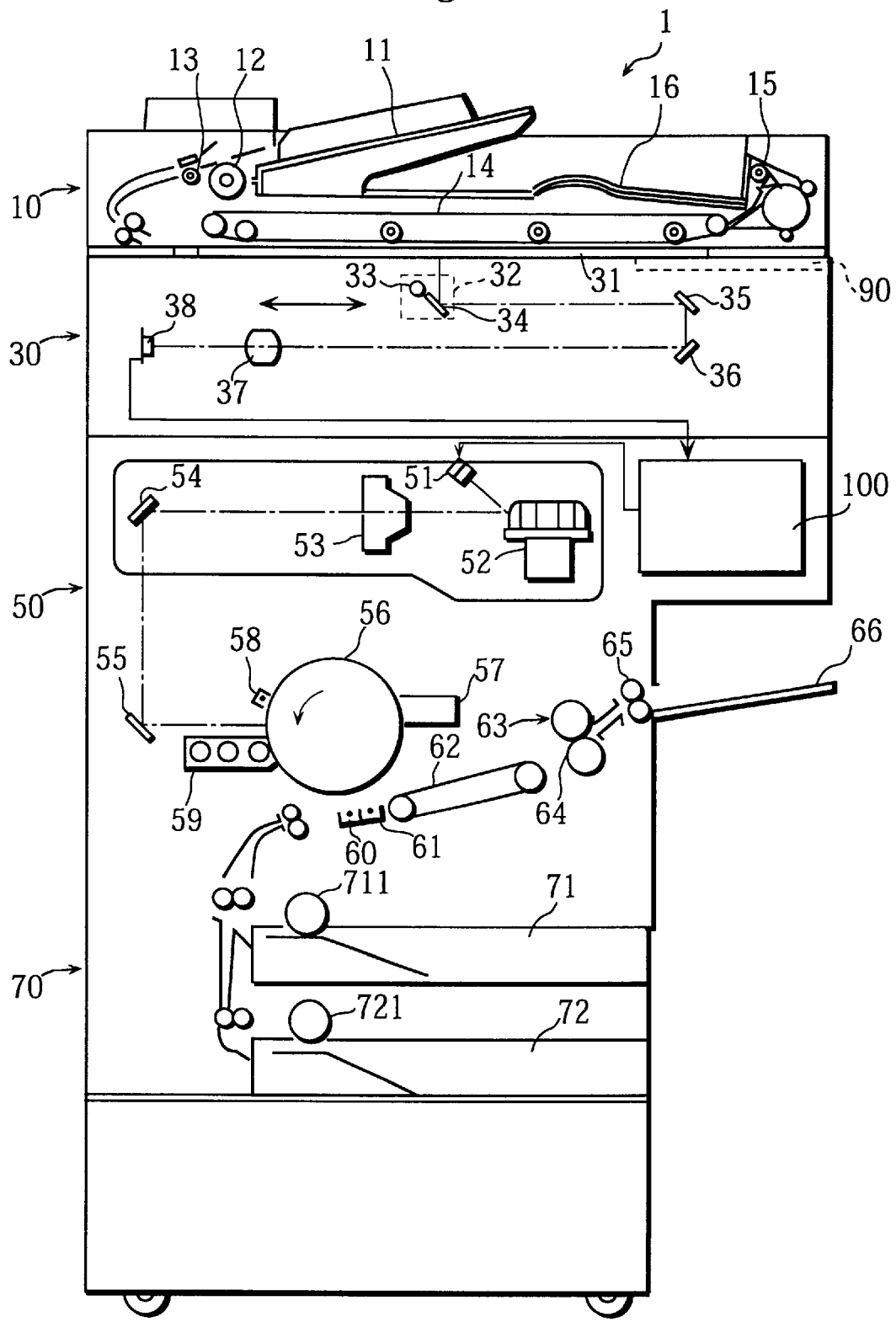
FIG. 2 is a cross sectional view showing the overall construction of a copier in which a document orientation recognizing device of the first embodiment of the present invention is provided.

The overall construction of a copier 1 in which the document orientation recognizing device of the present invention is provided is described, with reference to FIG. 2.

As shown in FIG. 2, the copier 1 is composed of an automatic document feeder (referred to as the "ADF" hereinafter) 10, an image reading unit 30, a printing unit 50, and a paper supplying unit 70.

The ADF 10 automatically transports documents one by one to the image reading unit 30. The documents placed on a document tray 11 are transported downward one at a time by a paper feeding roller 12 and a take-up roller 13. The document is then transported to a document reading position of a platen glass 31 by a transport belt 14.

The document transported to the document reading position is scanned by the scanner 32 provided in the image reading unit 30. After this, the document is transported to the right (as the copier 1 is viewed in FIG. 2) by the transport belt 14 and discharged onto a discharge tray 16 via a discharge roller 15.

The image reading unit 30 includes a scanner 32 and a CCD image sensor (referred to as the "CCD") 38, and optically reads an image of the document transported to the document reading position of the platen glass 31 using the scanner 32 and the CCD 38.

The scanner 32 is provided with an exposure lamp 33 and a mirror 34. A light emitted by the exposure lamp 33 is reflected off the document, and the mirror 34 redirects the light so that the light path is parallel to the platen glass 31. The scanner 32 laterally moves as indicated by the arrow in FIG. 2 to scan the document set on the platen glass 31. After being reflected off the document and redirected by the mirror 34, the light is guided to the CCD 38 via mirrors 35 and 36 and a converging lens 37. The CCD 38 converts the light into electric signals and so generates image data.

Figure 4:
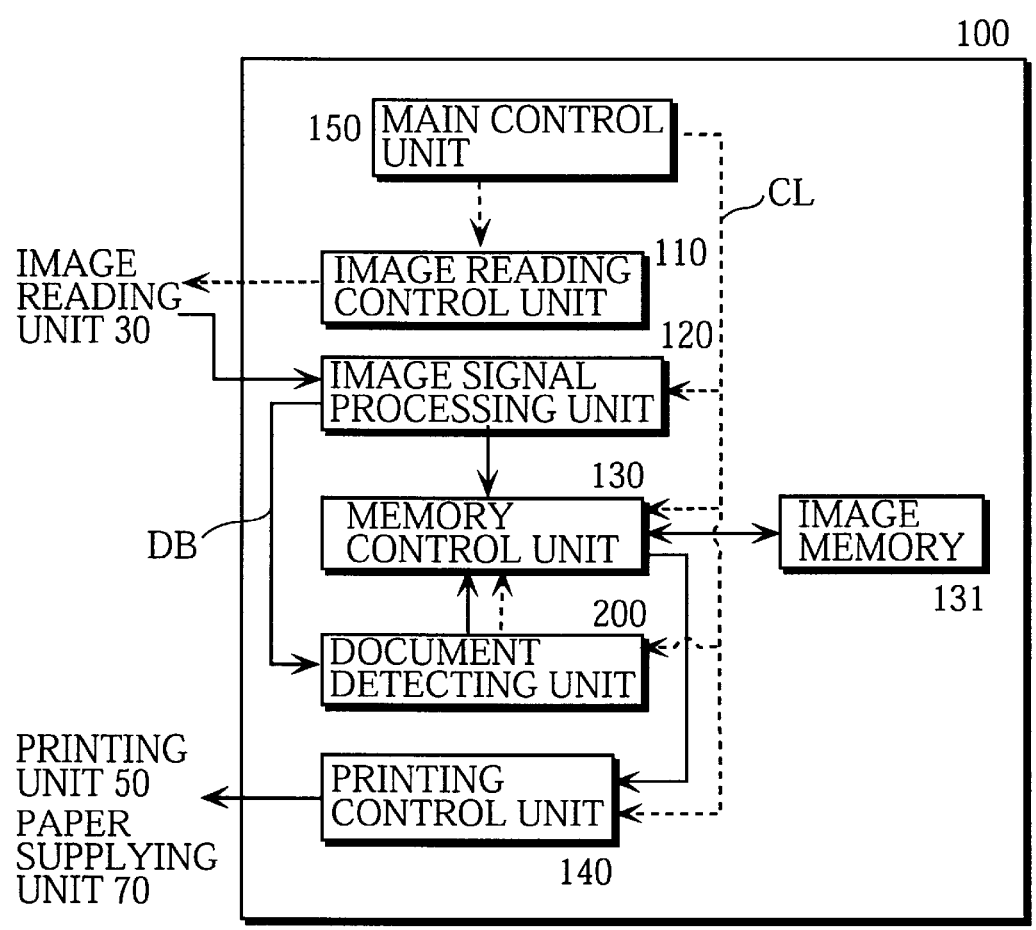
FIG. 4 is a block diagram showing the construction of a control unit of the copier.

The image data is converted into digital signals through the A/D conversion performed by an image signal processing unit 120 included in a control unit 100 shown in FIG. 4. After various correction processes are performed on the image data, the image data is stored in an image memory 131 shown in FIG. 4. In accordance with the result of the orientation detection performed by a document detecting unit 200 as described later in this specification, rotation processing is performed on the image data stored in the image memory 131. Then, the image data becomes a driving signal of a laser diode (referred to as the "LD" hereinafter) 51 of the printing unit 50.

The printing unit 50 forms an image on a recording sheet according to the well-known electrophotographic method. Receiving the driving signal, the printing unit 50 activates the LD 51, which then emits a laser beam. The laser beam is reflected off a facet of a polygon mirror 52 that is rotating at a predetermined angular speed, and scans a surface of a photosensitive drum 56 via an fθ lens 53 and mirrors 54 and 55.

Before this scanning process performed on the photosensitive drum 56, a cleaning unit 57 removes remaining toner particles from the surface of the photosensitive drum 56. Also, an eraser lamp (not shown) neutralizes any surface potential remaining on the surface of the photosensitive drum 56. The surface of the photosensitive drum 56 is then uniformly charged by a sensitizing charger 58. In this charged state, the laser beam scans the surface of the photosensitive drum 56, so that an electrostatic latent image is formed on the surface of the photosensitive drum 56.

A developing unit 59 develops the electrostatic latent image formed on the surface of the photosensitive drum 56 into a visible toner image.

The paper supplying unit 70 includes paper cassettes 71 and 72 as shown in FIG. 2. In synchronization with the stated exposure and development operations performed on the photosensitive drum 56, a recording sheet of a required size is fed by a feeding roller 711 or 721 from the corresponding paper cassette 71 or 72. The recording sheet comes in contact with the surface of the photosensitive drum 56 at the bottom of the photosensitive drum 56. By means of static electricity of the transfer charger 60, the toner image formed on the surface of the photosensitive drum 56 is transferred onto the recording sheet.

After this, the recording sheet is separated from the surface of the photosensitive drum 56 by static electricity of a separation charger 61, and is transported to a fixing unit 63 by a transport belt 62.

The toner image transferred onto the recording sheet is fixed by the fixing unit 63 using a fixing roller 64 provided with a heater. By the application of heat from the heater, the toner particles are fused and fixed in place on the recording sheet. After this, the recording sheet is discharged onto a discharge tray 66 by a discharge roller 65.

Meanwhile, when making copies of a book, the user lifts up the ADF 10 and sets the book, that is opened to a desired page, on the platen glass 31.

Figure 3:
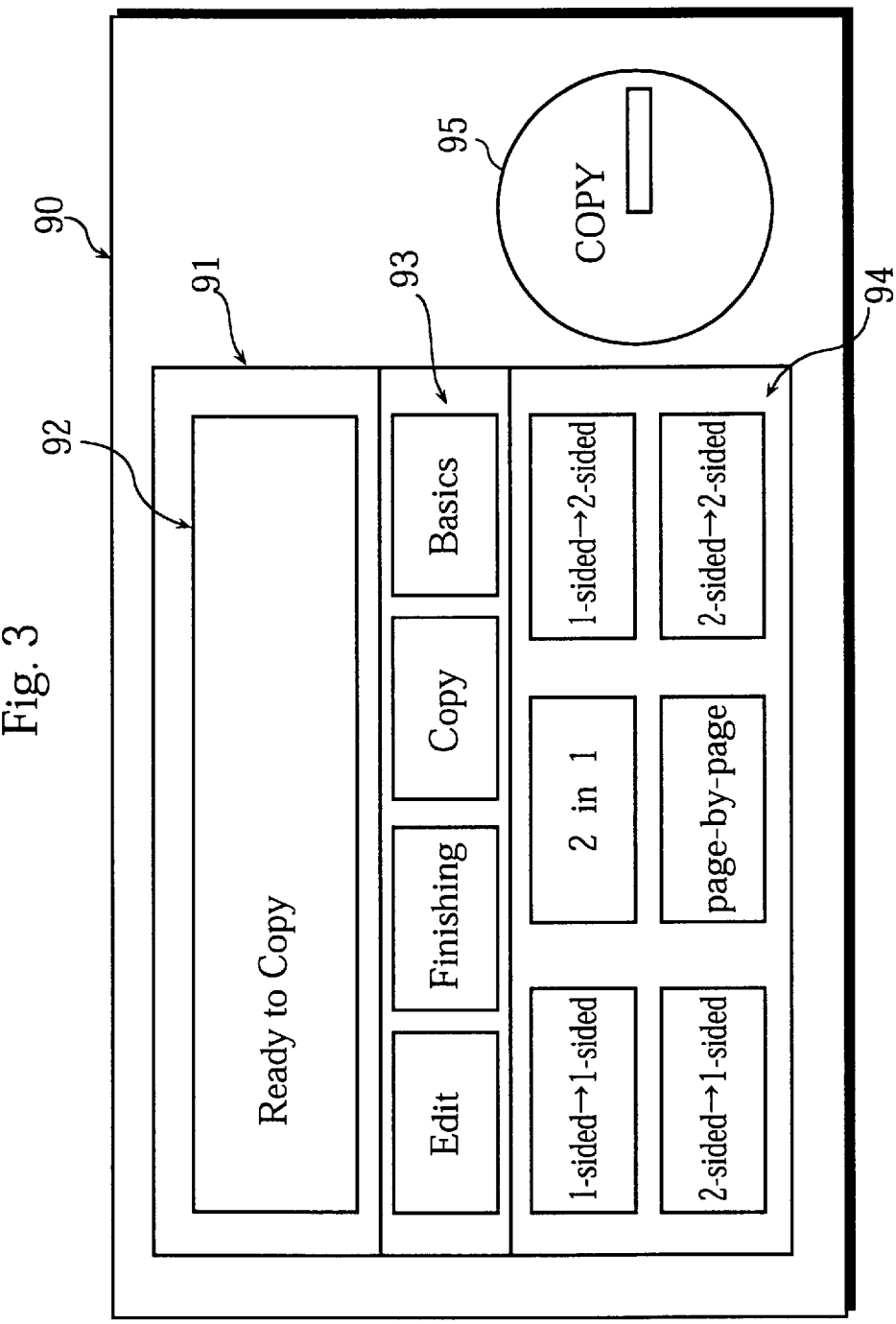
FIG. 3 shows the appearance of an operation panel of the copier.

An operation panel 90 is provided at an optimum position on the top of the image reading unit 30. FIG. 3 shows an appearance of the operation panel 90, which is provided with a copy start key 95 and a liquid crystal display (LCD) unit 91 for displaying messages and operation keys.

The LCD unit 91 includes a message display section 92, a first selection key display section 93, and a second selection key display section 94. Transparent touch panels are respectively laminated on surfaces of the first and second selection key display sections 93 and 94. The user can input an instruction by touching a corresponding key displayed on the screen.

When the user touches one of the keys of the first selection key display section 93, the corresponding selection keys are displayed on the second selection key display section 94 and the user can input a more specific instruction. FIG. 3 shows a case where a copy key of the first selection key display section 93 is touched and the corresponding keys are displayed on the second selection key display section 94. The user touches a page-by-page key when making copies of a book. By doing so, the page-by-page mode is set, so that double-page spreads of the book are read page by page, and an image of each page is formed on a different side of a recording sheet.

(2) Construction of the Control Unit 100

The following is a description of the construction of the control unit 100 provided in the copier 1. FIG. 4 is a block diagram showing the construction of the control unit 100.

The control unit 100 includes an image reading control unit 110, an image signal processing unit 120, a memory control unit 130, a printing control unit 140, a main control unit 150, and a document detecting unit 200. Each of these units has a CPU as the main component. Information and commands are sent/received between these units of the control unit 100 via command lines (CL) which are drawn in dotted lines in FIG. 4. Image data is sent/received between these units via image data buses (DB) which are drawn in solid lines in FIG. 4.

The image reading control unit 110 controls operations of the ADF 10 and the image reading unit 30. Specifically, the image reading control unit 110 is activated by an execution instruction outputted from the main control unit 150, and has the ADF 10 sequentially transport documents. Then, the image reading control unit 110 instructs the image reading unit 30 to read an image of the transported document and to output the read image data of the document to the image signal processing unit 120.

The image signal processing unit 120 includes an A/D converter, a shading correction unit, and an MTF correction unit. The A/D converter converts the image data outputted from the CCD 38 into digital multivalued signals, and the shading correction unit corrects light distribution varying along the length of the exposure lamp 33 and variations in sensitivity of the CCD 38. After this, the MTF correction unit performs processes, such as an edge enhancement, for improving the image quality. Then, the image signal processing unit 120 outputs the image data to the document detecting unit 200 and the memory control unit 130.

In accordance with the received image data, the document detecting unit 200 detects the orientation of the present document image. When judging from the detection result that the document image needs to be rotated, the document detecting unit 200 instructs the memory control unit 130 to perform the rotation processing on the image data. The construction and processing of the document detecting unit 200 are described in detail later in this specification.

The memory control unit 130 performs binarization, and compression when necessary, on the image data outputted from the image signal processing unit 120 and temporarily stores the image data into the image memory 131. On receiving an instruction from the main control unit 150, the memory control unit 130 reads the image data from the image memory 131, converts the image data back into the multivalued signals, and decompresses the image data when it has been compressed. As a result, the image data is restored to its previous state as it was before being stored into the image memory 131. When having been instructed by the document detecting unit 200 to perform the rotation processing on the image data, the memory control unit 130 rotates the image data a necessary angle. Then, the memory control unit 130 outputs the rotated image data to the printing control unit 140 so that image formation processing is performed. Note that the rotation processing is performed according to the well-known technique as disclosed in Japanese Laid-Open Patent Application No. S60-126769, for example.

The printing control unit 140 converts the image data outputted from the memory control unit 130 into a laser diode driving signal, and outputs the signal to the LD 51. As a result, the LD 51 performs scanning processing.

When receiving instructions, such as the number of copies to make, 1-sided or 2-sided copying, and copying start, from the user through the operation panel 90, the main control unit 150 notifies the instructions to corresponding units of the control unit 100. Then, the main control unit 150 controls processing timings of the units so that the copying operation would be smoothly performed.

(3) Construction of the Document Detecting Unit 200

The following is a description of the construction and processing of the document detecting unit 200 provided in the control unit 100. The document detecting unit 200 performs the orientation detection processing as described below.

Figure 5:
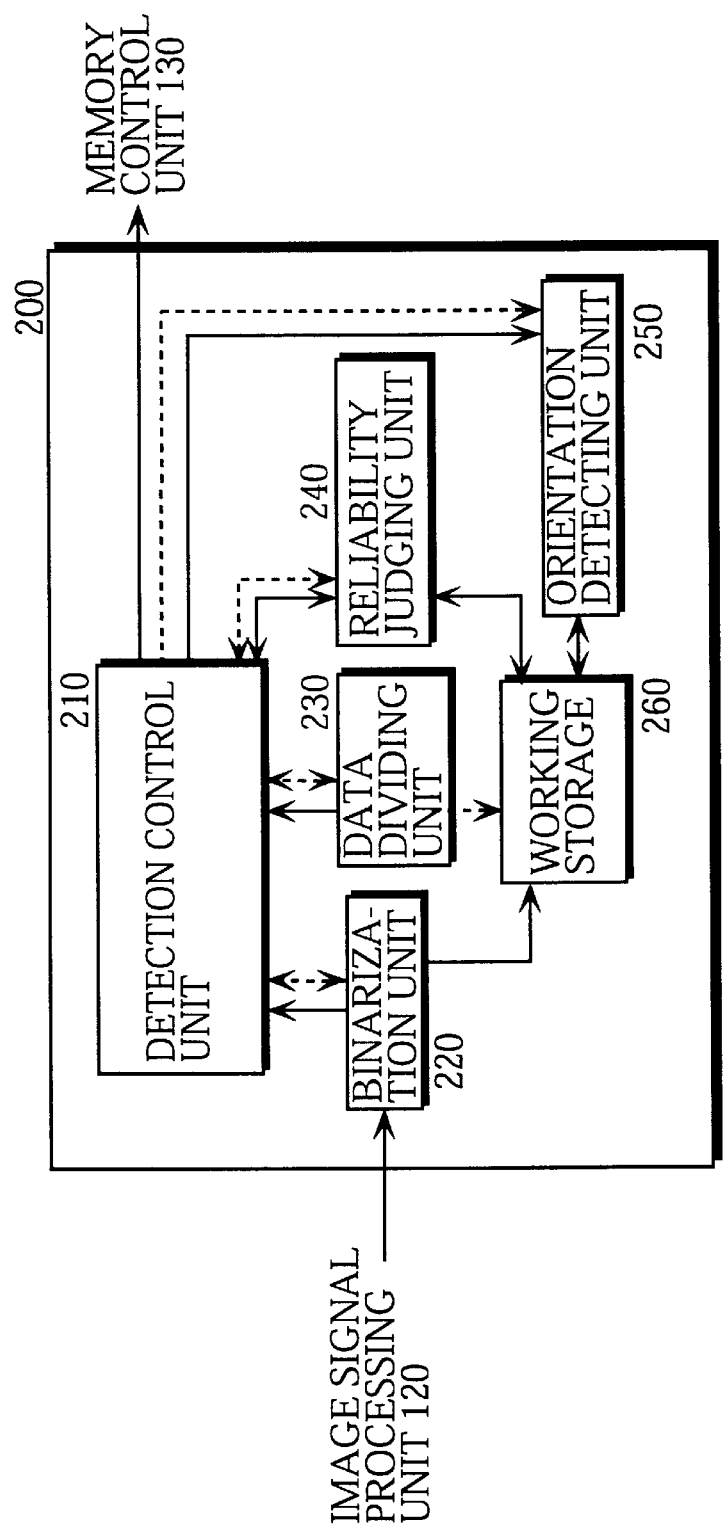
FIG. 5 is a block diagram showing the construction of a document detecting unit included in the control unit.

FIG. 5 is a block diagram showing the construction of the document detecting unit 200. The document detecting unit 200 includes a detection control unit 210, a binarization unit 220, a data dividing unit 230, a reliability judging unit 240, an orientation detecting unit 250, and a working storage 260.

The binarization unit 220 compares multi-gradation image data outputted from the image signal processing unit 120 with a predetermined threshold level to convert the multi-gradation image data into binary image data. The binarization unit 220 stores the binary image data into the working storage 260, and informs the detection control unit 210 of the end of the binarization process for one page.

In accordance with an instruction from the detection control unit 210, the data dividing unit 230 divides the binary image data stored in the working storage 260 into a plurality of data blocks. In doing so, the data dividing unit 230 divides the image data in such a manner that the whole image of the document is divided into a plurality of areas. Here, one data block corresponds to one area.

Figure 6:
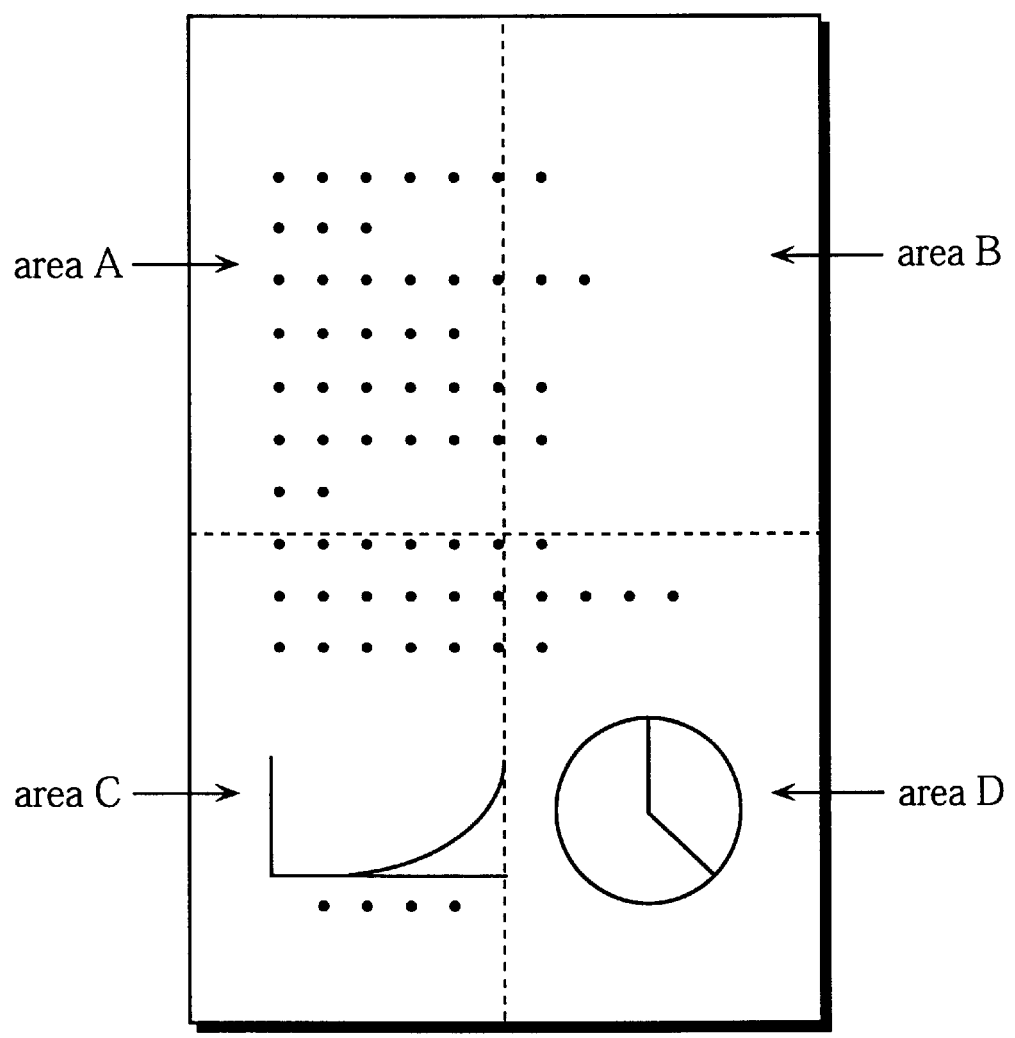
FIG. 6 is a drawing to help explain how image data of a document is divided by the document detecting unit.

FIG. 6 is a drawing to help explain the division of the binary image data. In this example, the image of the document is divided into halves in the main scanning and sub-scanning directions respectively. As a result, the image is divided into areas A, B, C, and D as shown in FIG. 6.

The data dividing unit 230 informs the reliability judging unit 240 of identification information of the image data for each area A to D. The identification information referred to here is an address of the image data stored in the working storage 260. The data dividing unit 230 then informs the detection control unit 210 of the end of the process.

According to the address informed by the data dividing unit 230, the reliability judging unit 240 generates histograms of the main scanning and sub-scanning directions for each area stored in the working storage 260, and judges whether characters included in the image data of the area are written substantially in the main scanning or sub-scanning direction. Hereinafter, the substantial direction in which the characters included in the image data of the area are written (i.e. the main scanning or sub-scanning direction) is referred to as the "line direction." After judging the line direction for each area from the corresponding histograms, the reliability judging unit 240 next judges reliability for each area in accordance with the histogram of the line direction of that area. The reliability shows a degree of precision of an orientation detection result that will be obtained when the corresponding image data is used for the orientation detection processing. In the present embodiment, an MTF (Modulation Transfer Function) value calculated using the histogram is used as a criterion of the reliability.

The reliability judging unit 240 calculates the MTF value as follows. The reliability judging unit 240 first divides the histogram of the line direction of the present area into several sections, calculates the MTF value for each section, and sets the mean value of the MTF values as the reliability of the area.

The MTF value is calculated by assigning max and min values of the section of the histogram into the following Equation 1.

$$MTF \text{ value}=(max-min)/(max+min) \quad \text{Equation 1}$$

Figure 7:
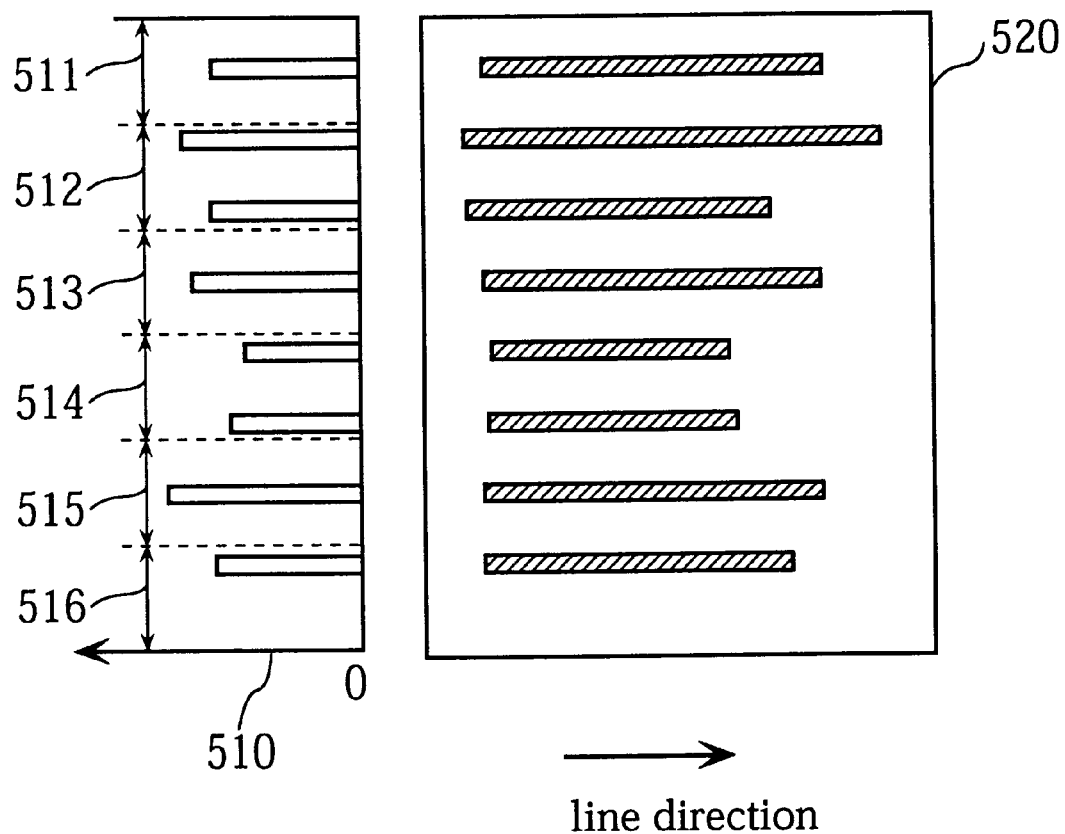
FIG. 7 shows examples of image data and a histogram where MTF (Modulation Transfer Function) values used as a criterion of the reliability are high.

FIG. 7 shows an example of image data where the reliability (namely, MTF value) is high. Note that image data 520 corresponds to one of the areas A, B, C, and D.

A histogram 510 is divided into six sections 511 to 516. The max value is different in each section, although the min value is "0" in every section 511 to 516. As such, each MTF value of the sections 511 to 516 of the histogram 510 is calculated as follows.

$$(max-0)/(max+0)=max/max=1$$

Here, "1" is the greatest value as the MTF value. The MTF value is calculated at the greatest value "1" since there are valleys (or, non-peak parts) representing "0" values in the histogram. This is to say that the image data 520 that has been used for generating the histogram 510 includes a plurality of character lines arranged, with spaces left between adjacent character lines.

The MTF value becomes low when the image of the area is slanting or when the area includes images aside from characters, such as a drawing and ruled lines of a table. In other words, the MTF value becomes low when the histogram has no valleys. The caption and table characters that are inappropriate to be used for the orientation detection are usually accompanied by a graph or ruled lines. This means that the area whose MTF value is low (i.e., the area including images aside from characters) is inappropriate to be used for the orientation detection. On the contrary, the area whose MTF value is high is considered to include character lines without slanting, and the reliability of the area in the orientation detection is high. For these reasons, the MTF value is used as the criterion of reliability of an orientation detection result that will be obtained through the orientation detection processing in the present embodiment.

Accordingly, the reliability judging unit 240 generates the histograms for each area of the document using the binary image data, divides the histogram of the line direction into several sections, and calculates the mean value of the MTF values of the sections as the reliability of the area in question. After obtaining the reliability, the reliability judging unit 240 outputs the address of the binary image data of the area, the addresses of the histograms, and the value representing the reliability of the area as one set to the detection control unit 210. In FIG. 6, out of the four areas A to D, the areas C and D include graphs and so the reliability of those areas C and D is low. Meanwhile, the area B includes no graphs or drawings, but includes a large blank. Therefore, the area A that includes character lines only has the highest degree of reliability.

The orientation detecting unit 250 performs the orientation detection processing on the area (the area A in this example) whose address is outputted from the detection control unit 210. Note that this area is judged by the reliability judging unit 240 to have the highest degree of reliability. The orientation detecting unit 250 performs the orientation detection processing according to the well-known technique. Various techniques for orientation detection are disclosed (see Japanese Laid-Open Patent Applications Nos. H04-229763 and H07-65120, for example) and, therefore the detailed explanation is omitted in this specification. However, the basic steps of the orientation detection processing are described as follows.

According to the well-known method, the orientation detecting unit 250 retrieves data corresponding to one character from the image data of a target area. In doing so, the orientation unit 250 retrieves a part where a character data exists and, therefore, will not retrieve a blank part of the area, by referring to the histograms. The orientation detecting unit 250 then searches for character data as a master character from a character pattern dictionary set in a memory (not shown). When the master character is found, the orientation detecting unit 250 compares it with the retrieved character every time the master character is rotated a 90° angle. When the master character matches the retrieved character, the orientation detecting unit 250 outputs that angle (90°, 180°, or 270° angle) the master character has been rotated as information regarding the orientation of the retrieved character.

Next, the detection control unit 210 is described. Note that the detection control unit 210 controls the entire processing performed by the document detecting unit 200. Thus, the operations performed by the document detecting unit 200 are also described below.

Figure 8:
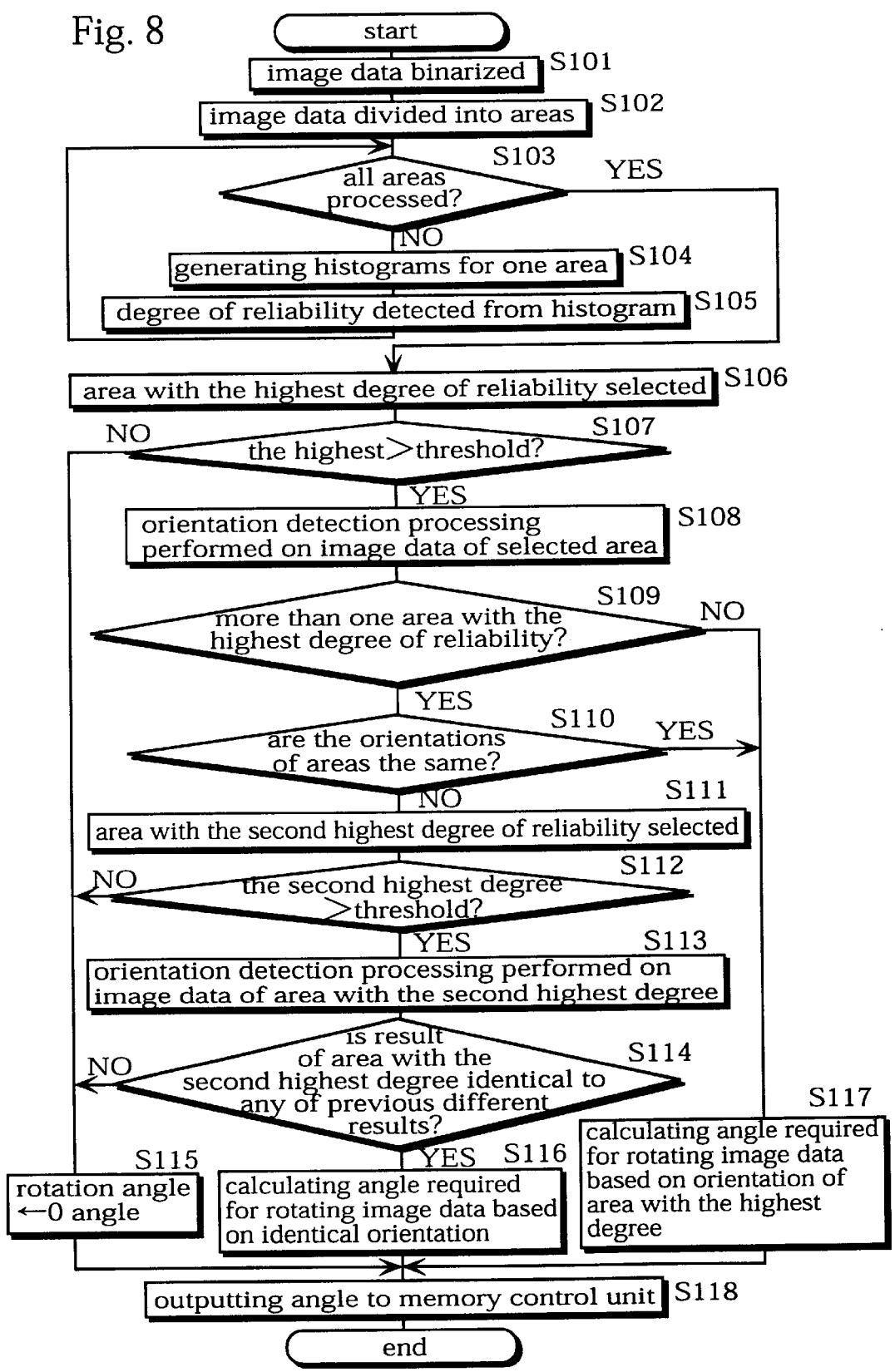
FIG. 8 is a flowchart showing the orientation detection processing performed by the document detecting unit.

FIG. 8 is a flowchart showing the orientation detection processing performed by the document detecting unit 200.

On receiving the image data outputted from the image signal processing unit 120 after the stated correction processes, the document detecting unit 200 starts the orientation detection processing.

The detection control unit 210 first instructs the binarization unit 220 to binarize the image data before temporarily storing the image data into the working storage 260 (step S101), and then instructs the data dividing unit 230 to divide the image data. On receiving the instruction, the data dividing unit 230 divides the binary image data (step S102).

Having been informed of the number of divided areas and the corresponding addresses from the data dividing unit 230, the detection control unit 210 outputs this information to the reliability judging unit 240 which is then calculates the reliability for each area using the information. The reliability judging unit 240 generates histograms of the main scanning and sub-scanning directions for one area (step S104), calculates the MTF value, and informs the detection control unit 210 of the calculated MTF value (step S105). The reliability judging unit 240 repeats these steps S104 and S105 until all of the areas are processed ("YES" in step S103).

The detection control unit 210 holds the information regarding the reliability every time it is outputted from the reliability judging unit 240. When the information for all of the areas has been outputted, the detection control unit 210 selects the area to be used for the orientation detection in accordance with the outputted degrees of reliability of the areas. In doing so, the detection control unit 210 selects the area whose degree of reliability is the highest (step S106). The detection control unit 210 compares this highest degree of reliability with a predetermined threshold. When the highest degree of reliability is below the threshold ("NO" in step S107), the detection control unit 210 does not give an execution instruction to the orientation detecting unit 250 and outputs the information regarding the image rotation angle (0 angle in this case) to the memory control unit 130 (steps S115 and S118). Here, the highest degree of reliability is compared with the threshold for the following reason. The degree of reliability is determined as the highest by being compared with the other degrees of reliability. As one example, suppose that an area has a relatively low reliability like 20% and others have even lower reliability like 10% or so. In this case, the reliability of 20% is judged as the highest. However, a reliable result cannot be obtained through the orientation detection performed on the area with that highest degree of reliability. Hence, the orientation detection processing is not performed in this case. The copying operation is performed, with the orientation of the document being the way it was set by the user.

Meanwhile, when the highest degree of reliability is equal to or greater than the threshold ("YES" in step S107), the detection control unit 210 outputs the addresses of the binary image data and histograms of the area to the orientation detecting unit 250 and simultaneously instructs the orientation detecting unit 250 to perform the orientation detection processing in accordance with the binary image data and histograms associated with the outputted addresses. In response to this instruction, the orientation detecting unit 250 performs the processing (step S108). When there is only one area whose degree of reliability is the highest ("NO" in step S109), the orientation detecting unit 250 outputs the orientation detection result to the detection control unit 210. In accordance with the result, the detection control unit 210 calculates an angle required for rotating the image data of the document and outputs the calculated angle to the memory control unit 130 (step S117).

When there are more than one area whose degree of reliability is the highest ("YES" in step S109) and the results obtained for the areas are the same (that is, the orientations of the areas are the same) ("YES" in step S110), the orientation commonly found in these results is judged as the orientation of the present document. On the other hand, when the results obtained for these areas are different ("NO" in step S110), the detection control unit 210 has the orientation detecting unit 250 perform the orientation detection processing on the area whose degree of reliability is the second highest (step S111). Before instructing so to the orientation detecting unit 250, the detection control unit 210 compares the second highest degree of reliability with the threshold, and has the orientation detection processing performed only when the second highest degree of reliability is equal to or greater than the threshold (steps S112 and S113). When the second highest degree of reliability is below the threshold ("NO" in step S112), the detection control unit 210 judges that it is impractical to perform the orientation detection processing on this area and outputs the information regarding the image rotation angle (0 angle in this case) to the memory control unit 130 (steps S115 and S118). The processing is then terminated.

Meanwhile, when the orientation detection processing is performed on the area with the second highest degree of reliability, the detection control unit 210 compares the result (i.e., the orientation of the image data) with each of the previous different results that have been obtained for the areas whose degrees of reliability were the highest. When the result obtained for the area with the second highest degree of reliability is identical to at least one of the previous different results ("YES" in step S114), the detection control unit 210 calculates an angle required for rotating the image data based on the identical orientations (step S116) and outputs the angle to the memory control unit 130 (step S118).

Meanwhile, when the result obtained for the area with the second highest degree of reliability is identical to none of the previous different results obtained for the areas with the highest degree ("NO" in step S114), the detection control unit 210 judges that it is impractical to perform the orientation detection processing and outputs the information regarding the image rotation angle (0 angle in this case) to the memory control unit 130 (steps S115 and S118).

As understood from the above description, in the present embodiment, the document detecting unit 200 divides the image data into a plurality of areas (four areas in the present embodiment) and performs the orientation detection processing on one character retrieved from the image data of the area whose degree of reliability is the highest. When doing so, the document detecting unit 200 divides the image data into areas under a simple rule and does not judge the attribute (text, title, caption, or table character) for each area. The degree of reliability for each area is determined from the MTF value obtained from the histogram of the line direction of the area. As a result, load of the orientation detection processing can be significantly reduced as compared with the conventional method. Also, by means of the MTF value used as the criterion of reliability, the orientation detection processing will not be performed on the caption and table characters that tend to cause detection errors, so that the reliability of detection results is not lower than results obtained through the conventional method.

In the present embodiment, the reliability of an area in the orientation detection processing is judged to be high or low in accordance with the MTF value obtained from the histogram of the area. However, the reliability of the area may be judged from the number of edges in the histogram.

FIG. 9 shows a relation between the number of edges and the image data. In FIG. 9, image data 620 includes a plurality of character lines that are horizontally written and left-aligned without slanting, and a histogram 610 is a histogram of the image data 620 in the direction perpendicular to the line direction of the image data 620. In the histogram 610, starting from the left, an edge point where its value is increased from the previous value is referred to as the "rising edge" and indicated as an unshaded dot, and an edge point where its value is decreased from the previous value is referred to as the "falling edge" and indicates as a shaded dot. As shown in FIG. 9, the number of rising edges (two in the histogram 610) is smaller than the number of falling edges (four in the histogram 610). This is because the starting positions of the character lines are aligned to the left except for the new lines while the ending positions of the character lines are not aligned. When the image data includes slanting character lines, graphs, or drawings, the number of edges are increased and a difference between the respective numbers of rising and falling edges is relatively small. This is to say, to find the image data including many character lines, attention should be directed toward an area in which a difference between the numbers of rising and falling edges is relatively great. When the total number of rising and falling edges is small and a difference between the numbers of rising and falling edges is relatively great, the image data of the corresponding area is quite likely to include character lines which are not slanting as of the case with the image data 620 shown in FIG. 9. As a result, the orientation detection processing can be performed with a high degree of reliability on the basis of the image data of the area including the character lines.

Second Embodiment

The second embodiment of the present invention relates to a document orientation recognizing device which can reliably perform the orientation detection processing of a document image obtained through reading a page from a book.

The overall construction of a copier to which the document orientation recognizing device of the second embodiment of the present invention is applied is the same as the construction shown in FIG. 2 that were explained in the first embodiment. Therefore, the overall construction of the copier is not explained in the present embodiment. However, the construction of a control unit 100 that is different from the control unit 100 of the first embodiment is explained, with reference to the block diagram shown in FIG. 10

Figure 10:
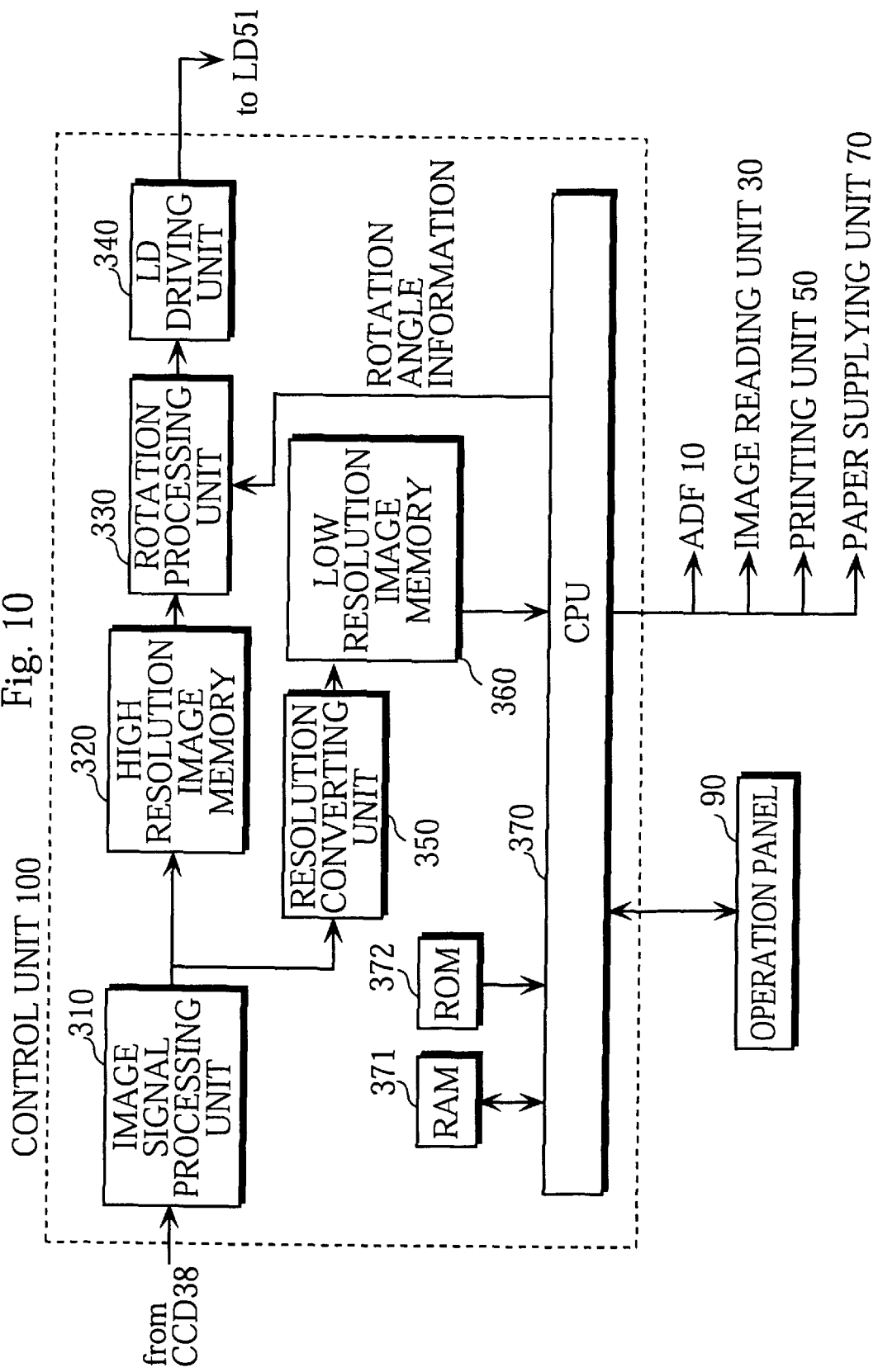
FIG. 10 is a block diagram showing the construction of a control unit of a copier in which the document orientation recognizing device of the second embodiment is provided.

As shown in FIG. 10, the control unit 100 of the present embodiment includes an image signal processing unit 310, a high resolution image memory 320, a rotation processing unit 330, an LD driving unit 340, a resolution converting unit 350, a low resolution image memory 360, and a CPU 370.

When the user sets the page-by-page mode through the operation panel 90 and presses the copy start key 95 (shown in FIG. 2), the CPU 370 instructs the image reading unit 30 to read a double-page spread of a book page by page. The read image data is converted into electric signals by the CCD 38. The electric signals are then transmitted as reflectivity data to the image signal processing unit 310.

The image signal processing unit 310 includes a density converter, an A/D converter, a shading correction unit, and an MTF correction unit, a scaling unit, and a γ correction unit. The reflectivity data outputted from the CCD 38 is converted into density data by the density converter before being converted into digital multivalued signals by the A/D converter. Then, the shading correction unit corrects light distribution varying along the length of the exposure lamp 33 and variations in sensitivity of the CCD 38. Following this, the MTF correction unit performs processes, such as an edge enhancement, for improving the image quality. Also, the scaling unit and the γ correction unit respectively perform a scaling process and a γ correction process. After this, the image signals are transmitted to the high resolution image memory 320 and the resolution converting unit 350.

In accordance with an instruction from the CPU 370, the rotation processing unit 330 reads the image data associated with a target page from the high resolution image memory 320, performs the rotation processing on the image data when necessary, and transmits the image data to the LD driving unit 340. The rotation processing of the rotation processing unit 330 is performed according to the well-known technique of changing the address of the image data. This technique is disclosed in the cited Japanese Laid-Open Patent Application No. S60-126769, for example.

It should be noted here that whether or not to perform the rotation processing on the image data and which page of the double-page spread of a book is the first to be copied depend on a result of the orientation detection processing performed by the CPU 370. In this regard, a more detailed explanation will be given later in this specification.

The LD driving unit 340 generates a driving signal from the image data outputted from the high resolution image memory 320 and transmits the driving signal to the LD 51. The CPU 370 controls the printing unit 50 and the paper supplying unit 70 according to programs stored in a ROM 372, so that an image is reproduced on a recording sheet.

Meanwhile, the resolution converting unit 350 converts the image data with high resolution outputted from the image signal processing unit 310 into the image data with low resolution. The image data with the low resolution is then written into the low resolution image memory 360. More specifically, in the present embodiment, the image data with 400 dpi or 600 dpi resolution that has been read by the CCD 38 is converted into the image data with 25 dpi or 40 dpi resolution. As one example, this resolution conversion is performed as follows. The image data is first divided into blocks that each are composed of 4×4 pixels, so that each block is composed of 16 pixels. Then, the greatest value of the density is obtained for each block and that greatest value is set as the density of the block. In this way, each divided block is treated as a new pixel, so that the resolution can be reduced to 1/16. This resolution conversion may be repeated until the resolution becomes a desired resolution. The resolution is changed from high to low for the purpose of reducing the amount of data and so smoothly executing the orientation detection processing.

The image data of the double-page spread that has been converted into the image data with low resolution is stored into the low resolution image memory 360 for each page. The CPU 370 has the orientation detection processing performed on the image data for each page.

There are various methods of detecting orientations. In the present embodiment, the method which is disclosed in Japanese Laid-Open Patent Application No. H09-9040, for example, is employed. More specifically, by means of this method, the orientation detection processing is performed using histograms generated on the basis of the sums of density values of the image data in the main scanning and sub-scanning directions respectively.

Figure 11:
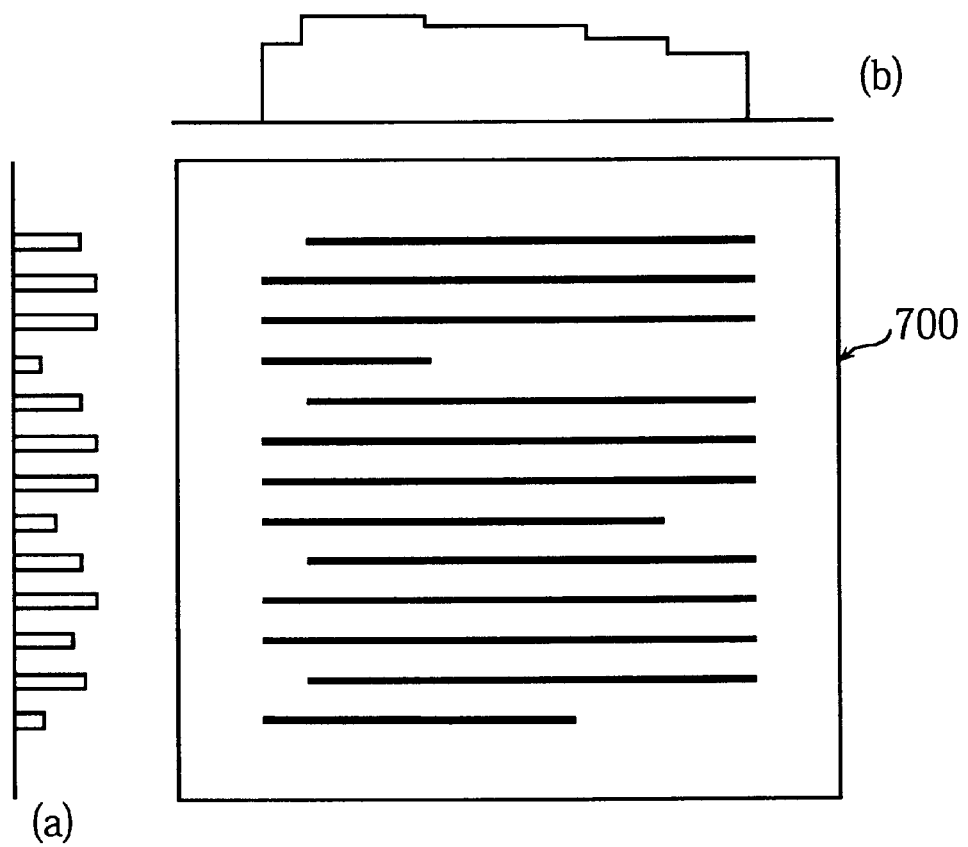
FIG. 11 shows examples of image data and histograms to explain the orientation detection processing performed in the document orientation recognizing device.

FIG. 11 shows examples of image data and histograms to explain how to detect the orientation of a document. In this example, a document 700 is placed on the platen glass 31 with the longitudinal direction of the document 700 being parallel to the main scanning direction. The histograms are obtained from the image data read by the scanner 32, and the orientation detection processing is performed using these histograms.

More specifically, the number of rising edges (an edge point where its value is increased from the previous value) and the number of falling edges (an edge point where its value is decreased from the previous value) are counted for each of the histogram (a) of the sub-scanning direction and the histogram (b) of the main scanning direction. Also, the sum of the numbers of rising and falling edges, and a difference between the numbers of rising and falling edges are calculated for each of the histograms (a) and (b).

Since characters are horizontally written on the document 700 as shown in FIG. 11, the number of rising edges and the number of falling edges of the histogram (a) are almost equal. In addition, the sum of the numbers of rising and falling edges of the histogram (a) is greater than the sum of the numbers of the histogram (b). This is because, as to the histogram (a), a peak indicating a character line and a non-peak part (or, valley) indicating a space between character lines are alternately detected. Accordingly, the line direction of the document 700 can be determined.

Next, the starting positions of the character lines are detected from the histogram (b) of the direction perpendicular to the line direction of the document 700, that is, the main scanning direction. The starting positions of the character lines are aligned to the left. Therefore, when the orientation of the document 700 is correct as shown in FIG. 11, the rising edges of the histogram (b) are concentrated within a certain range. However, the ending position is different for each character line and, therefore, the falling edges indicating the ending positions of the character lines are distributed as compared with the rising edges. In general, when a difference between the numbers of rising and falling edges is relatively great, the number which is smaller than the other number can be judged as the number of edges corresponding to the starting positions of the character lines. Accordingly, the orientation of the document can be determined.

Note that, however, when the image of the document includes a graph or drawing, there is no regularity in the numbers of rising and falling edges as in the stated example. Thus, the orientation of the document cannot be determined. In this case, the reliability of the image data for the orientation detection is obtained. When the obtained degree of reliability is equal to or above a predetermined degree, the orientation detection processing is performed on the present page. On the other hand, when the obtained degree is below the predetermined degree, it is judged to be impractical to perform the orientation detection processing on the present page. The method of obtaining the degree of reliability is explained in detail later in this specification.

The CPU 370 performs the orientation detection processing on the image data of a double-page spread for each page. The CPU 370 judges each obtained result as the orientation of the corresponding page. When it has been judged to be impractical to perform the orientation detection processing on one page of the spread, the CPU 370 judges the result of the other page as the orientation of that page. This is because two pages on a double-page spread are usually oriented in the same direction.

When making copies from a book, the user opens the book and places it on the platen glass 31 in such a way that the spine of the book is parallel to the main scanning direction of the copier. When the line direction is judged to be horizontal (as shown in FIG. 11) through the stated processing, the contents of the book are horizontally written. In this case, the book is not Japanese-style and, therefore, when the orientation of the book placed on the platen glass 31 is correct, the image formation is performed for the left side page first. Meanwhile, when the book is placed in the other way round, the image data obtained by reading the right side page is rotated 180° angle and the image formation is performed for this right side page first.

When the line direction is judged to be vertical, the book is considered to be written vertically. In this case, when the book is written in Japanese, it is a Japanese-style book, meaning that the image formation is performed for the right side page first.

As to books, such as scientific or academic books, one page may be written horizontally and the other page may be written vertically on a double-page spread for the purpose of the use of cross-references. In this case, the CPU 370 may refer to the result that was obtained for each page on the previous double-page spread, and uses this result for the present double-page spread as well. Alternatively, the CPU 370 has the message display section 92 of the operation panel 90 display a message so that the user can check the orientations of the two pages on the spread and give an appropriate instruction through the operation panel 90.

When the orientation cannot be detected for either page on the spread, the CPU 370 has the message display section 92 of the operation panel 90 display a message informing the user that it is impractical to detect the orientation of either page.

In this way, in accordance with the judgement result of the line direction and the detection result of the orientation for each page, the CPU 370 judges whether or not to rotate the image data on the double-page spread, determines a rotation angle when necessary, and judges which page is the first to be printed out of the two pages on the spread. The CPU 370 transmits these judgements as rotation angle information and page reading information to the rotation processing unit 330, and has the printing unit 50 execute the image formation for each page based on the image data on which the rotation processing has been performed when necessary.

Consequently, the recording sheets on which the images have been formed in the correct orientation are discharged onto the discharge tray 66 in the correct order of the page numbers.

The program of the above processing is stored in the ROM 372, and a RAM 371 is used as a work area as needed.

Figure 12:
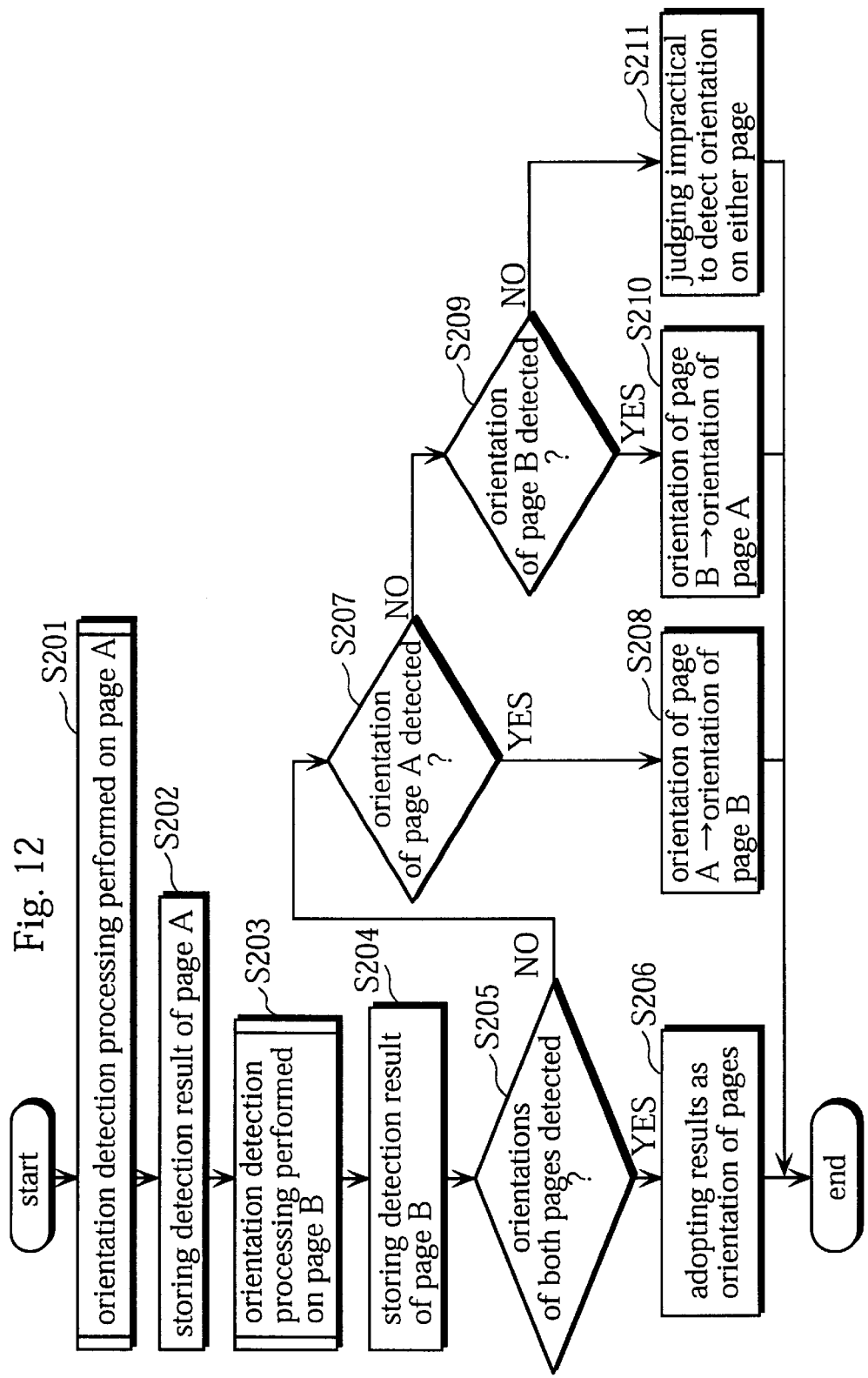
FIG. 12 is a flowchart showing the orientation detection processing performed by the control unit.

The following is a detailed description of the processing for the orientation detection processing controlled by the CPU 370, with reference to the flowchart shown in FIG. 12.

As explained above, when the page-by-page mode is set by the user, a double-page spread is read from a left side page first and then a right side page next, for example. In this example, the left side and right side pages are respectively referred to as the "page A" and "page B." The read image data of the two pages is converted into image data with low resolution and stored in the low resolution image memory 360.

The control unit 100 performs the orientation detection processing on the page A which has been first read (step S201). FIG. 13 is a flowchart showing the orientation detection processing of step S201 in FIG. 12 that is performed for each page.

The CPU 370 reads the image data of the page A from the low resolution image memory 360, and adds up the density values in the main scanning and sub-scanning directions to generate the histograms as shown in FIG. 11 (step S300). In accordance with the histograms, the CPU 370 judges the line direction of the page A (step S310). The line direction of a page is judged from the following facts: ① the numbers of rising and falling edges of the histogram of the line direction are almost equal to each other (as in the case of the histogram (a) of FIG. 11); and ② the total number of edges of the histogram of the line direction is greater than the total number of edges of the other histogram.

Next, the CPU 370 obtains the degree of reliability of the image data for the orientation detection (step S320).

The method of obtaining the degree of reliability is explained again in the present embodiment using the following two examples.

The first example is a method using the MTF value calculated from a histogram of the image data. Here, the vertical direction of the document in portrait format is referred to as the main scanning direction and the horizontal direction is referred to as the sub-scanning direction. As described in the first embodiment, the histogram is divided into several sections in the main scanning direction, and the MTF value is calculated for each section by assigning a max and min values of the section into the stated Equation 1, which is shown below again.

$$MTF \text{ value}=(\max-\min)/(\max+\min) \qquad \text{Equation 1}$$

Hereinafter, each section of the histogram is referred to as the "line range."

Figure 14A:
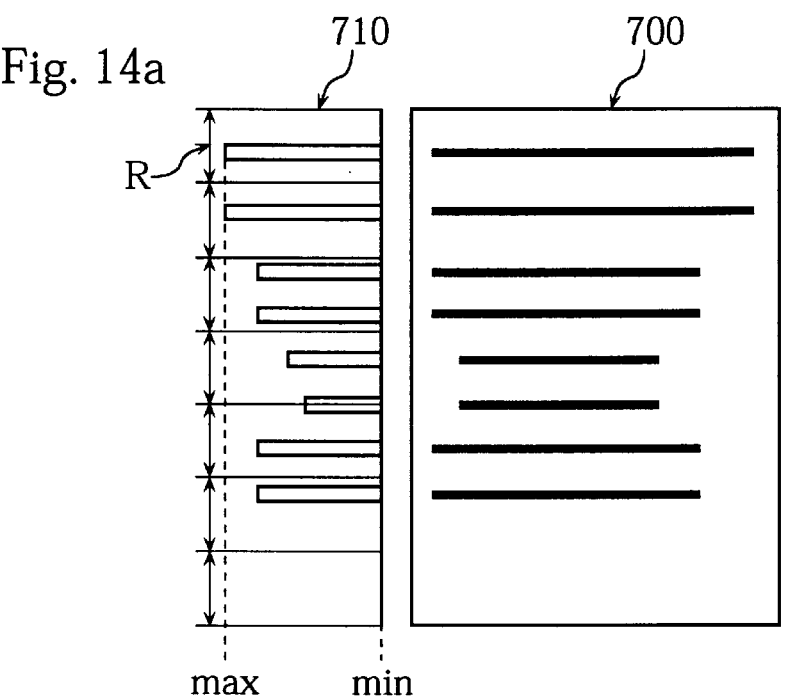
FIGS. 14a and 14b are drawings to help explain how to calculate MTF values.
Figure 14B:
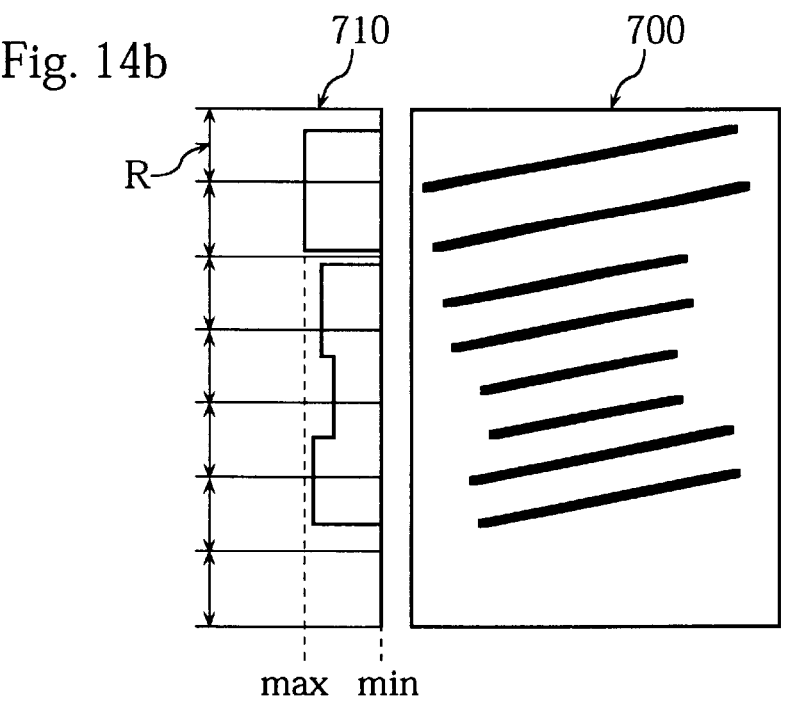

FIGS. 14a and 14b are drawings to help explain how to calculate the MTF values. The line range is indicated as "R" in these figures. FIG. 14a shows an example where the characters are written horizontally on the document 700 in portrait format. A histogram 710 is generated from the image data of the document 700 in the sub-scanning direction.

Since the character lines are perpendicular to the longitudinal direction of the document 700 in FIG. 14a, peaks indicating those character lines are detected in the histogram. On the other hand, peaks are not detected at parts corresponding to spaces between the character lines, so that the min value is "0" in every line range. As a result, the MTF value is calculated at "1" in every line range, and the value "1" is the highest value as the MTF value according to the Equation 1. Therefore, the mean value of the MTF values of the line ranges is high in a case where the character lines are not slanting, that is, where the histogram is reliably obtained to be used for detecting the orientation of the document.

Meanwhile, when the character lines are slanting as shown in FIG. 14b, each width of the peaks of the histogram 710 may be broad, with the width being measured in the main scanning direction. This makes a difference between the max and min values small and so makes the MTF value small. As a result, the mean value of the MTF values of the histogram may be low in a case where the character lines are slanting, that is, where the histogram is not reliable to be used for detecting the orientation of the document. When the character lines are slanting, there is no regularity in the edges of the histogram of the main scanning direction, thereby making difficult to reliably perform the orientation detection (see FIG. 15c). It should be obvious that the MTF value is low when the document includes a graph or drawing.

As readily understood from the above description, when the mean value of the MTF values obtained from the image data of the document is low, it is impractical to perform the orientation detection.

The second example is a method of calculating the degree of reliability by counting the number of edges of a histogram.

This second method is based on the fact that, when a histogram is generated from a document that only includes character lines, with the document being the right way up, the number of falling edges is greater than the number of rising edges in the histogram of the main scanning direction.

Figure 15A:
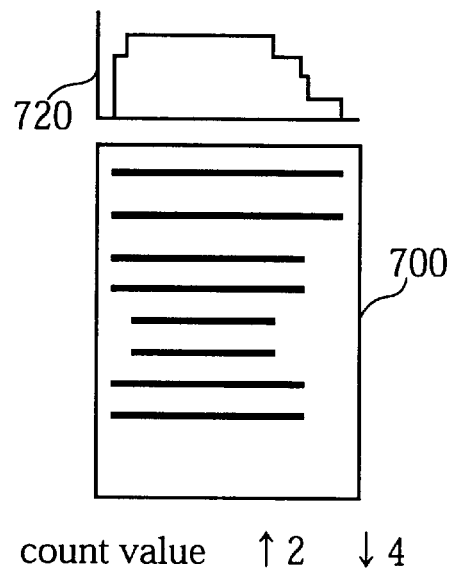
FIGS. 15a, 15b, and 15c are drawings to help explain how to obtain a degree of the reliability of the orientation detection processing using the method of counting edges of the histograms.
Figure 15B:
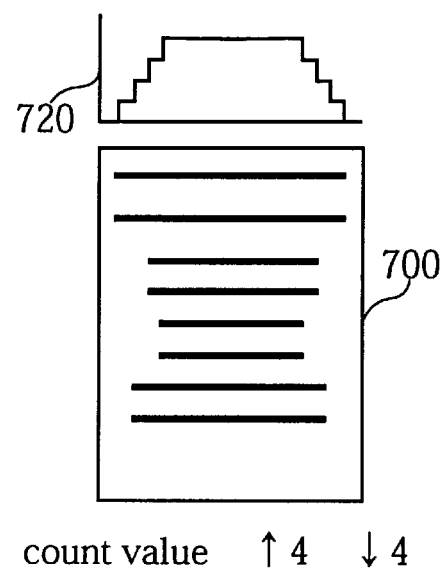
Figure 15C:
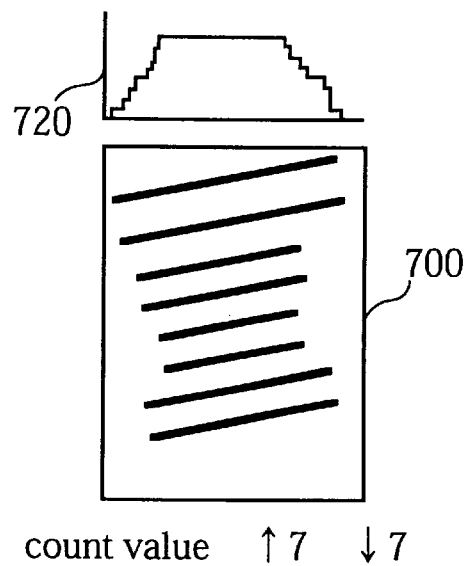

FIGS. 15a, 15b, and 15c are drawings to help explain how to obtain the degree of reliability through counting the edges of the histogram. In each figure, a histogram 720 is generated from the image data of the document 700 in the main scanning direction. FIG. 15a is an example where character lines are perpendicular to the longitudinal direction of the document 700. FIG. 15b is an example where character lines are perpendicular to the longitudinal direction of the document 700 and the character lines are all centered. FIG. 15c is an example where characters lines are slanting.

In FIG. 15a, the starting positions of the character lines are almost aligned, so that the number of rising edges is two, while the ending positions of the character lines are distributed, so that the number of falling edges is four. Therefore, when the character lines are not slanting as shown in FIG. 15a, that is, when a histogram that is appropriate to be used in the orientation detection can be obtained, a difference between the numbers of rising and falling edges is great.

However, when the character lines are centered as shown in FIG. 15b and when the character lines are slanting as shown in FIG. 15c, a difference between the numbers of rising and falling edges is not so great.

Using the method of obtaining the degree of reliability through counting the number of edges of the histogram, the degree of reliability is judged to be high when a difference between the numbers of rising and falling edges is great. Specifically, although depending on the number of character lines included in the document, the orientation detection processing can be reliably performed when the difference is, on average, two or more.

Figure 16:
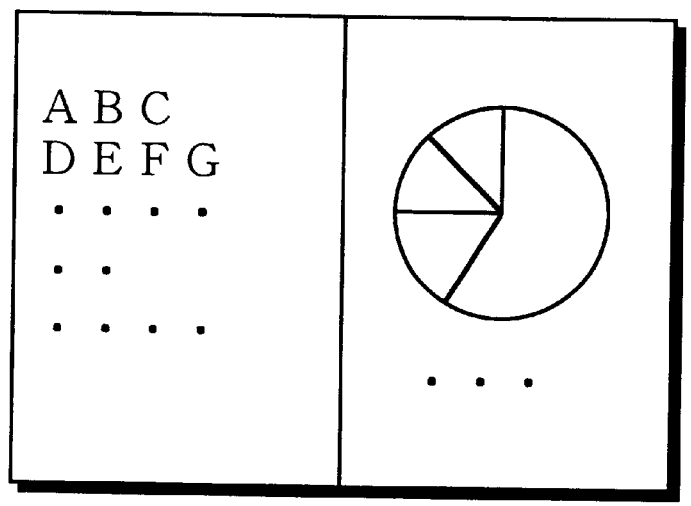
FIG. 16 is a document example that includes a page whose orientation cannot be determined.

In addition to the stated example where the characters lines are slanting, it is impractical to perform the orientation detection processing when the document includes a figure like a circle graph as shown in the right side page of a document in FIG. 16. It should be obvious that the same can be said to a case where a document includes a table, illustration, or the like.

Using one or both of the methods, the CPU 370 judges whether the degree of reliability is equal to or above a predetermined degree, and so judges whether it is practical to perform the orientation detection processing (step S330). Here, when using the second method, the CPU 370 judges whether the difference between the numbers of rising and falling edges is two or more.

When judging that it is practical to perform the orientation detection processing, the CPU 370 performs the orientation detection processing on the image of the document 700 by counting the edges of the histogram of the direction perpendicular to the line direction of the document 700 (step S340). The line direction has been already judged in step S310. Therefore, the CPU 370 counts the respective numbers of rising and falling edges of the histogram of the main scanning direction and judges which number is greater than the other. When the number of rising edges is smaller than the number of falling edges, the image of the document is judged to be the right way up. On the other hand, when the number of rising edges is greater than the number of falling edges, the image of the document is judged not to be the right way up. In this way, the orientation of the image of the document 700 can be detected.

Accordingly, the result obtained in the orientation detection processing indicates that the image of the document is oriented in the forward direction (or, the image of the document is the right way up), that the image of the document is oriented in the reverse direction, or that it is impractical to judge the orientation of the document. In general, a book is judged to be written horizontally when the line direction is horizontal, while a book is judged to be written vertically when the line direction is vertical as in a Japanese-style book. For this reason, in the present embodiment, the CPU 370 only detects whether a document is oriented in the forward direction or reverse direction and judges practicability of the orientation detection processing.

Figure 17:
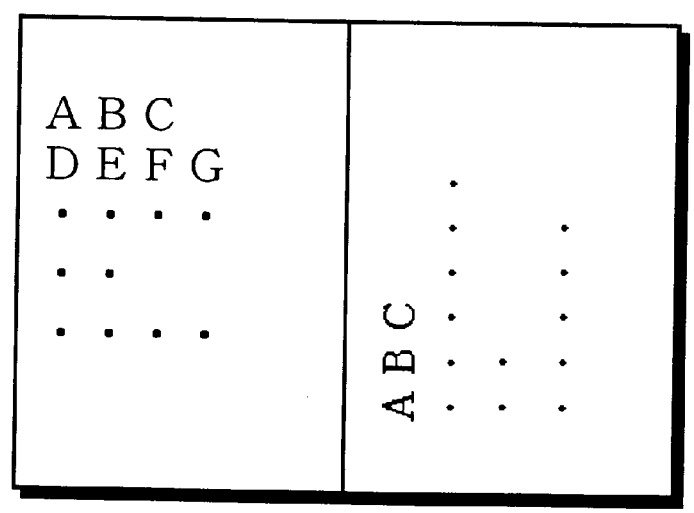
FIG. 17 is a document example that includes a page on which characters are written horizontally in the vertical line direction.

As to special scientific books, there may be rare cases where characters are written horizontally in the vertical line direction as shown in the right side page of FIG. 17 and where characters are written vertically in the horizontal line direction. In these cases, it is desirable to judge whether the document is oriented in the rightward direction or leftward direction in addition to judging whether the document is oriented in the forward direction or reverse direction. For doing so, the well-known character recognition method as stated in the first embodiment may be employed. More specifically, data corresponding to one character is retrieved from the image data of the document and compared with a corresponding master character stored in a character pattern dictionary of an internal memory. The character is compared with the master character every time the master character is rotated a 90° angle. Consequently, in addition to the top and bottom, the right and left of a document can be detected.

Then, the detection result is stored in the RAM 371 (step S202). The CPU 370 performs the orientation detection processing on the page B in the same way as it did on the page A (step S203), and stores the result into the RAM 371 (step S204).

The CPU 370 judges, from the detection results stored in the RAM 371, whether the orientation has been detected for both of the pages A and B (step S205). If so, the CPU 370 adopts the detection results as the orientations of the pages A and B (step S206).

When both of the orientations of the pages A and B have not been detected ("NO" in step S205), the CPU 370 proceeds to step S207 and judges whether the orientation of the page A has been detected. If so ("YES" in step S207), this means that the orientation of the page B could not be detected, so that the CPU 370 regards the orientation of the page A as the orientation of the page B as well (step S208). The CPU 370 makes this judgement based on the fact that the orientations of two pages on a double-page spread are usually the same.

When judging that the orientation of the page A could not be detected ("NO" in step S207), the CPU 370 proceeds to step S209 and judges whether the orientation of the page B has been detected. If so ("YES" in step S209), the CPU 370 regards the orientation of the page B as the orientation of the page A as well for the same reason stated in step S208 (step S210).

When judging that the orientation of the page B could not be detected ("NO" in step S209), the CPU 370 judges that it is impractical to judge the orientations of the pages A and B (step S211)

In accordance with the orientation results, the CPU 370 generates the rotation angle information and transmits it to the rotation processing unit 330 and judges which page is the first to be printed out of the two pages A and B. The CPU 370 then has the printing unit 50 execute the image formation for the pages A and B in the order that the CPU 370 determined.

When judging that the orientation could be detected for neither of the pages A and B, the CPU 370 has the LCD unit 91 of the operation panel 90 display a message to inform the user that it is impractical to judge the orientation of either page. When the user presses the copy start key 95 again after checking the orientation of the book set on the platen glass 31 according to the displayed message, the image formation is performed in accordance with the read image data without performing the orientation detection processing. The CPU 370 judges which page on the double-page spread is the first to be printed in this case according to the detection results of the previous pages, assuming that the book placed on the platen glass 31 is the right way up.

In the stated embodiments, the present invention has been described as the document orientation recognizing device applied to monochrome copiers, although this document orientation recognizing device of the present invention can be applied to full-color copiers. In this case, it is desirable for the copier to include a circuit for previously deleting chromatic image data from image data generated from the document and to perform the orientation detection processing using monochromatic image data only. This is because characters that are used for the orientation detection are normally monochrome. It should be noted here that the circuit for deleting chromatic image data is realized by the well-known technique and, therefore, the detailed explanation is omitted in this specification.

In the stated embodiments, the present invention has been described as the document orientation recognizing device included in the copiers, although this document orientation recognizing device of the present invention may be included in signal processing units of image readers, printers, and the like. Alternatively, the document orientation recognizing device of the present invention can be constructed as a discrete device, and may be connected to the image readers, printers, and the like via appropriate interfaces.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A document orientation recognizing device which recognizes an orientation of an image of a document in accordance with a set of image data of the document, comprising:

a dividing unit which divides the set of image data into a plurality of data blocks, each data block corresponding to a different area obtained by dividing the image of the document;

a reliability calculating unit which calculates a reliability for each data block for a case where a set of image data of the data block is used in an orientation recognition of the image of the document;

a selecting unit which selects at least one data block whose reliability is higher than other data blocks in accordance with the reliability calculated for each data block by the reliability calculating unit; and a recognizing unit which recognizes the orientation of the image of the document in accordance with each set of image data of the at least one data block selected by the selecting unit, wherein the reliability calculating unit generates a histogram for each data block from the set of image data of the data block and calculates the reliability for each data block in accordance with a difference between a maximum value and a minimum value of the histogram.

2. A document orientation recognizing device which recognizes an orientation of an image of a document in accordance with a set of image data of the document, comprising:

a dividing unit which divides the set of image data into a plurality of data blocks, each data block corresponding to a different area obtained by dividing the image of the document;

a reliability calculating unit which calculates a reliability for each data block for a case where a set of image data of the data block is used in an orientation recognition of the image of the document;

a selecting unit which selects at least one data block whose reliability is higher than other data blocks in accordance with the reliability calculated for each data block by the reliability calculating unit; and a recognizing unit which recognizes the orientation of the image of the document in accordance with each set of image data of the at least one data block selected by the selecting unit, wherein the reliability calculating unit generates a histogram for each data block from the set of image data of the data block and calculates the reliability for each data block in accordance with a number of rising points and a number of falling points in the histogram, a rising point indicating a turning point where a present value increases from a previous value and a falling point indicating a turning point where a present value decreases from a previous value.

3. A document orientation recognizing device which recognizes an orientation of an image of a document in accordance with a set of image data of the document, comprising:

a dividing unit which divides the set of image data into a plurality of data blocks, each data block corresponding to a different area obtained by dividing the image of the document;

a reliability calculating unit which calculates a reliability for each data block for a case where a set of image data of the data block is used in an orientation recognition of the image of the document;

a selecting unit which selects at least one data block whose reliability is higher than other data blocks in accordance with the reliability calculated for each data block by the reliability calculating unit; and a recognizing unit which recognizes the orientation of the image of the document in accordance with each set of image data of the at least one data block selected by the selecting unit, wherein the recognizing unit detects, when the selecting unit selects more than one data block, an orientation of an image for each data block selected by the selecting unit in accordance with a set of image data of the data block, and judges, when the orientations of the images of more than one data block are identical to each other, the identical orientation as the orientation of the image of the document.

4. The document orientation recognizing device of claim 3 wherein the recognizing unit detects, when all of the orientations of the images of more than one data block having been selected by the selecting unit are not identical, an orientation of an image of a data block which was not selected by the selecting unit and whose reliability is secondly higher than other data blocks, with this data block being set as a reference data block, and judges, when the orientation of the image of the reference data block is identical to one of the orientations detected fore more than one data block having been selected by the selecting unit, the orientation of the image of the reference data block as the orientation of the image of the document.

5. A document orientation recognizing device which recognizes an orientation of an image of a document in accordance with a set of image data of the document, comprising:

a dividing unit which divides the set of image data into a plurality of data blocks, each data block corresponding to a different area obtained by dividing the image of the document;

a reliability calculating unit which calculates a reliability for each data block for a case where a set of image data of the data block is used in an orientation recognition of the image of the document;

a selecting unit which selects at least one data block whose reliability is higher than other data blocks in accordance with the reliability calculated for each data block by the reliability calculating unit;

a recognizing unit which recognizes the orientation of the image of the document in accordance with each set of image data of the at least one data block selected by the selecting unit;

an image rotating unit which performs a rotation process on the set of image data of the document to rotate the image of the document in accordance with the orientation of the image of the document judged by the recognizing unit; and a prohibiting unit which prohibits the image rotating unit from performing the rotation process when the reliability of at least one data block having been selected by the selecting unit is below a predetermined threshold.

6. An image forming apparatus comprising:

an image reader which obtains a set of image data of a document by reading an image of the document;

a dividing unit which divides the set of image data into a plurality of data blocks, each data block corresponding to a different area obtained by dividing the image of the document;

a reliability calculating unit which calculates a reliability for each data block for a case where a set of image data of the data block is used in an orientation recognition of the image of the document;

a selecting unit which selects at least one data block whose reliability is higher than other data blocks in accordance with the reliability calculated for each data block by the reliability calculating unit;

a recognizing unit which recognizes the orientation of the image of the document in accordance with each set of image data of the at least one data block selected by the selecting unit; and an image forming unit which forms an image in accordance with the set of image data of the document, wherein the reliability calculating unit generates a histogram for each data block from the set of image data of the data block and calculates the reliability for each data block in accordance with a difference between a maximum value and a minimum value of the histogram.

7. An image forming apparatus comprising:
an image reader which obtains a set of image data of a document by reading an image of the document;
a dividing unit which divides the set of image data into a plurality of data blocks, each data block corresponding to a different area obtained by dividing the image of the document;
a reliability calculating unit which calculates a reliability for each data block for a case where a set of image data of the data block is used in an orientation recognition of the image of the document;
a selecting unit which selects at least one data block whose reliability is higher than other data blocks in accordance with the reliability calculated for each data block by the reliability calculating unit;
a recognizing unit which recognizes the orientation of the image of the document in accordance with each set of image data of the at least one data block selected by the selecting unit; and
an image forming unit which forms an image in accordance with the set of image data of the document,
wherein the reliability calculating unit generates a histogram for each data block from the set of image data of the data block and calculates the reliability for each data block in accordance with a number of rising points and a number of falling points in the histogram, a rising point indicating a turning point where a present value increases from a previous value and a falling point indicating a turning point where a present value decreases from a previous value.

8. A document orientation recognizing device comprising:
a receiving unit which receives two sets of image data associated with first and second pages of a double-Page spread; and
a recognizing unit which recognizes an orientation of an image of the first page in accordance with the set of image data associated with the first page, and recognizes an orientation of an image of the second page in accordance with the set of image data associated with the second page, wherein
the recognizing unit includes a judging unit which judges whether it is practical to detect the orientation of the image of one of the first and second pages, and judges, when the judging unit has judged that it is impractical to detect the orientation of the image of the page, the orientation of the image of the other page as the orientation of the image of the page,
the judging unit calculates a reliability of each set of image data of the first and second pages for a case where the set of image data is used in an orientation recognition of the image of a corresponding one of the first and second pages, and judges whether it is practical to detect the orientation of the image of the corresponding page in accordance with the reliability calculated for the corresponding page, and
the judging unit generates a histogram for each page from the set of image data of the page and calculates the reliability for each page in accordance with a difference between a maximum value and a minimum value of the histogram.

9. A document orientation recognizing device comprising:
a receiving unit which receives two sets of image data associated with first and second pages of a double-page spread; and
a recognizing unit which recognizes an orientation of an image of the first page in accordance with the set of image data associated with the first page, and recognizes an orientation of an image of the second page in accordance with the set of image data associated with the second page, wherein
the recognizing unit includes a judging unit which judges whether it is practical to detect the orientation of the image of one of the first and second pages, and idles, when the judging unit has judged that it is impractical to detect the orientation of the image of the page, the orientation of the image of the other page as the orientation of the image of the page,
the judging unit calculates a reliability of each set of image data of the first and second pages for a case where the set of image data is used in an orientation recognition of the image of a corresponding one of the first and second pages, and idles whether it is practical to detect the orientation of the image of the corresponding page in accordance with the reliability calculated for the corresponding page, and
the reliability calculating unit generates a histogram for each page from the set of image data of the page and calculates the reliability for each page in accordance with a number of rising points and a number of falling points in the histogram, a rising point indicating a turning point where a present value increases from a previous value and a falling point indicating a turning point where a present value decreases from a previous value.

10. An image forming apparatus of comprising:
an image reader which obtains two sets of image data associated with first and second pages of a double-page spread by reading images of the first and second pages;
a recognizing unit which recognizes an orientation of the image of the first page in accordance with the set of image data associated with the first page, and recognizes an orientation of the image of the second page in accordance with the set of image data associated with the second page; and
an image forming unit which forms each image of the first and second pages on a different recording sheet in accordance with each set of image data associated with the first and second pages,
wherein the recognizing unit includes a first judging unit which judges whether it is practical to detect the orientation of the image of the first page, and judges, when the first judging unit has judged that it is impractical to detect the orientation of the image of the first page, the orientation of the image of the second page as the orientation of the image of the first page.

11. The image forming apparatus of claim 10 further comprising:
a second judging unit for judging whether it is practical to detect the orientation of the image of the second page; and
an informing unit which informs a user that it is impractical to detect the orientations of the images of the first and second pages when it is.

12. An image forming apparatus comprising:
an image reader which obtains two sets of image data associated with first and second pages of a double-page spread by reading images of the first and second pages;
a recognizing unit which recognizes an orientation of the image of the first page in accordance with the set of image data associated with the first page, and recognizes an orientation of the image of the second page in accordance with the set of image data associated with the second page; and an image forming unit which forms each image of the first and second pages on a different recording sheet in accordance with each set of image data associated with the first and second pages, wherein the image forming unit includes an image rotating unit which performs a rotation process on the set of image data of a corresponding one of the first and second pages to rotate the image data of the corresponding page in accordance with the orientation of the image of the corresponding page recognized by the recognizing unit, and forms the image of the corresponding page in accordance with the processed set of image data.

13. An image forming apparatus comprising:

an image reader which obtains two sets of image data associated with first and second pages of a double-page spread by reading images of the first and second pages;

a recognizing unit which recognizes an orientation of the image of the first page in accordance with the set of image data associated with the first page, and recognizes an orientation of the image of the second page in accordance with the set of image data associated with the second page;

an image forming unit which forms each image of the first and second pages on a different recording sheet in accordance with each set of image data associated with the first and second pages; and an order setting unit which sets an order in which the image forming unit forms the images of the first and second pages in accordance with the orientations of the images of the first and second pages recognized by the recognizing unit, wherein the image forming unit forms the images of the first and second pages in the order set by the order setting unit.

14. An image forming apparatus comprising:

an image reader which obtains two sets of image data associated with first and second papers of a double-page spread by reading images of the first and second pages;

a recognizing unit which recognizes an orientation of the image of the first page in accordance with the set of image data associated with the first page, and recognizes an orientation of the image of the second page in accordance with the set of image data associated with the second page;

an image forming unit which forms each image of the first and second pages on a different recording sheet in accordance with each set of image data associated with the first and second pages; and a receiving unit which receives a setting of a page-by-page mode where each image of the first and second pages on the double-page spread is formed on a different recording sheet, wherein the recognizing unit recognizes each orientation of the images of the first and second pages when the receiving unit receives the setting of the page-by-page mode.

* * * * *